(12) United States Patent
Siebert et al.

(10) Patent No.: US 11,708,093 B2
(45) Date of Patent: Jul. 25, 2023

(54) TRAJECTORIES WITH INTENT

(71) Applicant: Zoox, Inc., Foster City, CA (US)

(72) Inventors: Kenneth Michael Siebert, Redwood City, CA (US); Gowtham Garimella, Burlingame, CA (US); Benjamin Isaac Mattinson, San Francisco, CA (US); Samir Parikh, Los Gatos, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 392 days.

(21) Appl. No.: 16/870,355

(22) Filed: May 8, 2020

(65) Prior Publication Data

US 2021/0347383 A1 Nov. 11, 2021

(51) Int. Cl.
*B60W 60/00* (2020.01)
*G01C 21/34* (2006.01)
*G08G 1/00* (2006.01)
*G06N 20/00* (2019.01)
*G01C 21/36* (2006.01)

(52) U.S. Cl.
CPC ..... *B60W 60/0025* (2020.02); *G01C 21/3407* (2013.01); *G01C 21/3453* (2013.01); *G01C 21/3691* (2013.01); *G06N 20/00* (2019.01); *G08G 1/20* (2013.01); *B60W 2556/45* (2020.02)

(58) Field of Classification Search
CPC .......... B60W 60/0025; B60W 2556/45; G06N 20/00; G01C 21/3407; G01C 21/3453; G01C 21/3691; G08G 1/20
See application file for complete search history.

(56) References Cited

U.S. PATENT DOCUMENTS

| 2013/0054106 | A1 | 2/2013 | Schmudderich et al. | |
| 2018/0281815 | A1* | 10/2018 | Stentz | H04W 4/40 |
| 2019/0094031 | A1* | 3/2019 | Md Saad | G06Q 10/06 |
| 2019/0311298 | A1* | 10/2019 | Kopp | G01C 25/00 |
| 2020/0142413 | A1* | 5/2020 | Zheng | B60W 10/18 |

(Continued)

FOREIGN PATENT DOCUMENTS

| CN | 104157149 A | * 11/2014 |
| WO | WO2018115963 A2 | 6/2018 |

OTHER PUBLICATIONS

PCT Search Report, and Written Opinion dated Jul. 22, 2021 for PCT application No. PCT/US21/29232, 9 pages.

(Continued)

*Primary Examiner* — Behrang Badii
*Assistant Examiner* — Jay Khandpur
(74) *Attorney, Agent, or Firm* — Lee & Hayes, P.C.

(57) ABSTRACT

Techniques to predict object behavior in an environment are discussed herein. For example, such techniques may include determining a trajectory of the object, determining an intent of the trajectory, and sending the trajectory and the intent to a vehicle computing system to control an autonomous vehicle. The vehicle computing system may implement a machine learned model to process data such as sensor data and map data. The machine learned model can associate different intentions of an object in an environment with different trajectories. A vehicle, such as an autonomous vehicle, can be controlled to traverse an environment based on object's intentions and trajectories.

20 Claims, 8 Drawing Sheets

(56) References Cited

U.S. PATENT DOCUMENTS

| | | |
|---|---|---|
| 2020/0159225 A1 | 5/2020 | Zeng et al. |
| 2020/0174481 A1 | 6/2020 | Van Heukelom et al. |
| 2020/0216076 A1* | 7/2020 | Otto .................... B60W 40/072 |
| 2021/0001981 A1* | 1/2021 | Ihalainen ............. G08G 5/0069 |
| 2021/0215493 A1* | 7/2021 | Kapadia ............. G01C 21/3697 |
| 2021/0347377 A1 | 11/2021 | Siebert et al. |

OTHER PUBLICATIONS

Office Action for U.S. Appl. No. 16/870,083, dated May 26, 2022, Siebert, "Trajectory Classification", 6 pages.

\* cited by examiner

TRAJECTORIES WITH INTENT

BACKGROUND

Planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future behavior (e.g., an intent) may be necessary to safely operate in the vicinity of the object, especially where the behavior may change based on a selected action of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
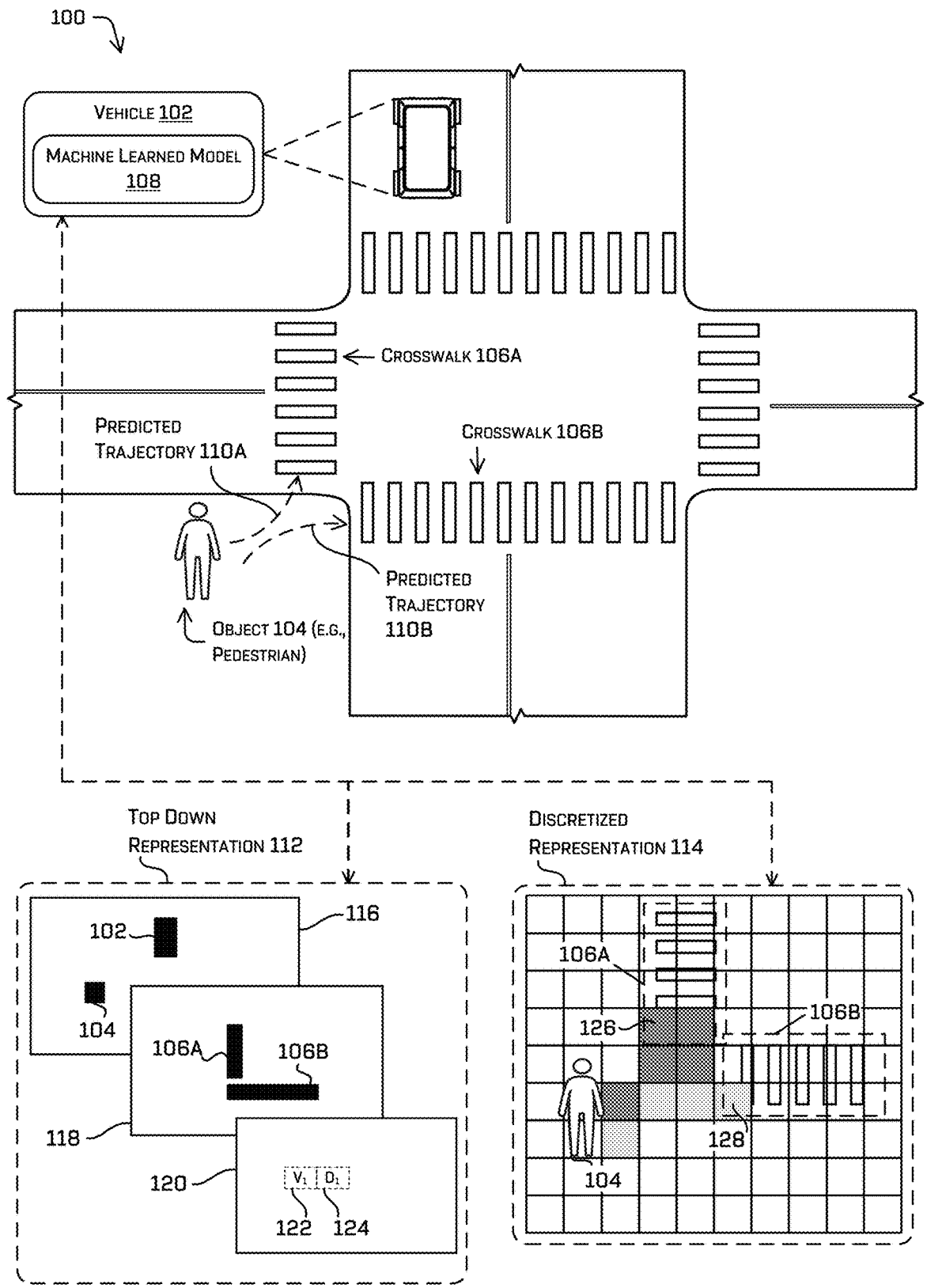
FIG. 1 is an illustration of an autonomous vehicle in an environment, in which an example machine learned model may process a top down representation of an environment to determine a discretized representation of the environment.

Predicting behavior or intent of objects in an environment may impact a potential action of an autonomous vehicle. In at least some examples, some such intents may change in response to the action performed by the vehicle. Movement of objects in the environment may change quickly.

This application describes techniques for applying and/or training a model to predict behavior of an object in an environment. In some examples, such behavior may comprise an intent that may be indicative of a motion the object may take at some point in the near future. For example, one or more machine learned models may receive information as an input comprising a trajectory associated with an object, a weight associated with the trajectory, and/or map data, and process the information to determine an intention of the object at a future time. In some examples, the object may be a pedestrian and the model(s) may predict a trajectory (or trajectory type) for the pedestrian and an intention of the pedestrian to reach a particular destination. In at least some examples, the model may be conditioned on an action to be performed by the vehicle (or that was performed) such that upon training the intent reflects interaction with the vehicle based on the action performed. Pedestrian trajectories, trajectory types, or intentions determined by the model(s) may be considered during vehicle planning thereby improving vehicle safety as a vehicle navigates in the environment by planning for the possibility that the pedestrian may use different trajectories to arrive at several possible destinations.

In some examples, a computing device may implement a machine learned model to predict an intent for an object (e.g., a bicycle, a pedestrian, another vehicle, an animal, etc.) that may result in an impact to operation of an autonomous vehicle. For instance, the machine learned model may receive map data and process the map data to determine an intent for a trajectory of the object in an environment surrounding the autonomous vehicle. In some examples, the machine learned model may predict the intention based on a semantic destination associated with the trajectory. By way of example and not limitation, the object may be a pedestrian and the machine learned model may determine that the pedestrian intends to enter a crosswalk (e.g., crosswalk intention), travel outside a crosswalk and in a road (e.g., jaywalk intention), and/or travel outside a crosswalk and outside a road (e.g., offroad intention).

The one or more intentions determined by the model may be associated with a trajectory of the object and/or a trajectory type. In some examples, the trajectory may be associated with more than one intention, in which case each intention may be output with an associated weight to indicate a likelihood of the object having the intention at a future time. For example, the model may determine that a bicyclist can follow a first trajectory having a first weight (e.g., 70%) for comprising the first intention (e.g., traveling along a road) and a second weight (e.g., 30%) for comprising the second intention (e.g., traveling into a crosswalk). In this way, a vehicle computing system of an autonomous vehicle may receive the output from the model (e.g., the trajectories, the weights, and the intentions) and determine a candidate trajectory to control the autonomous vehicle. This improves vehicle safety by taking into consideration several possible intentions of an object during planning operations.

As noted above, the machine learned model may, in some examples, determine a trajectory type for the object. For instance, the model may determine a location of an object relative to a location of the environment (e.g., a road boundary) and use the location to determine the trajectory type as at least one of: a road trajectory type or a freeform trajectory type. For example, a road trajectory type may be associated with the object located within a threshold distance of a road boundary while the freeform trajectory type may be associated with the object when the object is inside or outside a threshold distance from the road boundary.

In various examples, the machine learned model may associate an intent of the object with a trajectory type. For instance, the machine learned model may output an indication that an object has a road trajectory type with a crosswalk intention such as when a bicyclist travels along a road and will likely enter a crosswalk at an upcoming intersection. In another illustrative example, the machine learned model may predict that a pedestrian will have a freeform trajectory type and a jaywalk intention to represent a trajectory that can move in any direction, and may enter a road (independent of road rules). Generally, each of the different trajectory types may be communicated with a planning component of a vehicle which may in turn determine a candidate trajectory for the vehicle based at least in part on the trajectory type. The planning component may, for example, determine the candidate trajectory differently whether the object is associated with a road trajectory type as opposed to a freeform trajectory type. By identifying the trajectory type, the planning component may implement a different set of algorithms or parameters when determining the candidate trajectory in accordance with the trajectory type. This can lead to the planner generating trajectories with more detail more quickly than when the planner does not process the trajectory type as an input.

In some examples, the machine learned model may send information comprising the trajectory, the weight, and the intent to a planning component to control an autonomous vehicle. In such an example, a vehicle computer system of the autonomous vehicle may predict a candidate trajectory for the vehicle (using a same or different model) with consideration to an output (e.g., the intent, the trajectory, and the weight) from the machine learned model thereby improving vehicle safety by providing the autonomous vehicle with a candidate trajectory that is capable of safely avoiding the potential behavior by the object that may impact operation of the vehicle (e.g., intersect a trajectory of the autonomous vehicle, cause the autonomous vehicle to swerve or brake hard, etc.).

The autonomous vehicle may detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. As noted above, in some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be input into the models to determine behavior (e.g., one or more trajectories, direction, and/or intent, and so on) of objects in the environment.

In some examples, a model and/or computing device may receive the sensor data and may determine a type of object (e.g., classify the type of object), such as, for example, whether the object is a bicycle, a vehicle, a truck, a motorcycle, a moped, a pedestrian, or the like. For example, an object may be classified as both a bicycle and a pedestrian in which case the model may receive weighted object classes as an input (e.g., the object class is 25% bicycle, 75% pedestrian). In such examples, the model (or other model) may determine a first probability of the object being the bicycle and determine a second probability of the object being the pedestrian. Continuing with the same example, the model may process the weighted object classes to provide an output comprising a trajectory and a weight for each object class (e.g., for each of the bicycle and the pedestrian).

As described herein, models may be representative of machine learned models, statistical models, or a combination thereof. That is, a model may refer to a machine learned model that learns from a training data set to improve accuracy of an output (e.g., a prediction). For instance, a computing device may compare an output of the machine learned model to ground truth data and alter one or more parameters of the model based at least in part on the comparing. Additionally or alternatively, a model may refer to a statistical model that is representative of logic and/or mathematical functions that generate approximations which are usable to make determinations.

As described herein, in some examples, functionality performed by a first model and a second model may be performed by a single model. That is, the first model and the second model may be part of a single model.

In various examples, a vehicle computing system may receive one or more instructions representative of output(s) from one or more models. The vehicle computing system may, for instance, send an instruction from the one or more instructions to a planning component of the vehicle that plans a trajectory for the vehicle and/or to a perception component of the vehicle that processes sensor data. Additionally or alternatively, output(s) from one or more models may be used by one or more computing devices remote from the vehicle computing system for training a machine learned model.

The vehicle computing system may be configured to determine an initial position of each detected object. In various examples, a prediction component of the vehicle computing system (e.g., models that predict behavior of an object) may determine one or more predicted trajectories associated with each detected object, such as from an initial position associated therewith. In some examples, the one or more predicted trajectories may be determined based on the sensor data and/or output(s) from a model. Each predicted trajectory may represent a potential path that the detected object may travel through the environment. The one or more predicted trajectories may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof. In such examples, the one or more predicted trajectories may be based on an initial velocity and/or direction of travel determined based on the sensor data. In some examples, the one or more predicted trajectories may be determined utilizing machine learning techniques. Additional details of generating trajectories to control a vehicle are described in U.S. patent application Ser. No. 15/632,608, filed Jun. 23, 2017, entitled "Trajectory Generation and Execution Architecture," which is incorporated herein by reference. Additional details of evaluating risk associated with various trajectories are described in U.S. patent application Ser. No. 16/606,877, filed Nov. 30, 2018, entitled "Probabilistic Risk for Trajectory Evaluation," which is incorporated herein by reference. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In various examples, the vehicle computing system may be configured to determine actions to take while operating (e.g., trajectories to use to control the vehicle) based on predicted trajectories, intents, trajectory types, and/or weights determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

In various examples, the vehicle computing system may be configured to determine reference actions and/or sub-actions that are applicable to the vehicle in the environment. For example, a pedestrian traveling toward a crosswalk would be predicted to behave differently than a pedestrian walking away from a road, or from a pedestrian crossing the road outside the crosswalk. For another example, a pedestrian in a road may behave differently than a pedestrian outside of the road, or a pedestrian crossing a road outside a crosswalk. In another non-limiting example, a bicyclist traveling along a road would be predicted differently than a bicyclist traveling towards or inside a crosswalk.

For each applicable action and sub-action, the vehicle computing system may implement different models and/or components to simulate future states (e.g., estimated states) by projecting the vehicle and relevant object(s) forward in the environment for the period of time (e.g., 5 seconds, 8 seconds, 12 seconds, etc.). The models may project the object(s) (e.g., estimate future positions of the object(s)) forward based on a predicted trajectory associated therewith. For instance, the models may predict a trajectory of a pedestrian and predict a weight indicating whether the trajectory will be used by an object to arrive at a destination. The vehicle computing system may project the vehicle (e.g., estimate future positions of the vehicle) forward based on a vehicle trajectory associated with an action. The estimated state(s) may represent an estimated position (e.g., estimated location) of the vehicle and an estimated position of the relevant object(s) at a time in the future. In some examples, the vehicle computing system may determine relative data between the vehicle and the object(s) in the estimated state(s). In such examples, the relative data may include distances, locations, speeds, directions of travel, and/or other factors between the vehicle and the object. In various examples, the vehicle computing system may determine estimated states at a pre-determined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing system may store sensor data associated with actual location of an object at the end of the set of estimated states (e.g., end of the period of time) and use this data as training data to train one or more models. For example, stored sensor data may be retrieved by a model and be used as input data to identify cues of an object (e.g., identify a feature, an attribute, or a pose of the object).

Such training data may be determined based on manual annotation and/or by determining a change associated semantic information of the position of the object. As a non-limiting example, if an object at one point in time is on a portion of a map labeled as sidewalk and at some later point is on a portion of a drivable surface, the data associated between those periods of time and associated with the object may be labelled as an instance of jaywalking without the need for manual annotation. Further, detected positions over such a period of time associated with the object may be used to determine a ground truth trajectory to associate with the object. In some examples, the vehicle computing system may provide the data to a remote computing device (i.e., computing device separate from vehicle computing system) for data analysis. In such examples, the remote computing system may analyze the sensor data to determine one or more labels for images, an actual location, velocity, direction of travel, or the like of the object at the end of the set of estimated states. In some such examples (e.g., an example in which an intent of a pedestrian is determined), ground truth positions of the orientation over the course of the log may be determined (either hand labelled or determined by another machine learned model) and such ground truth positions may be used to determine an actual intent of the pedestrian (e.g., did the pedestrian remain standing, cross the road, begin/continue running, begin/continue walking, etc.). In some examples, corresponding data may be input into the model to determine an output (e.g., an intent, a trajectory, a weight, and so on) and a difference between the determined output and the actual action by the object may be used to train the model.

The techniques discussed herein may improve a functioning of a vehicle computing system in a number of ways. The vehicle computing system may determine an action for the autonomous vehicle to take based on a determined intent, trajectory, and/or trajectory type of the object represented by data. In some examples, using the behavior prediction techniques described herein, a model may output object trajectories and associated weights that improve safe operation of the vehicle by accurately characterizing motion of the object with greater granularity and detail as compared to previous models.

The techniques discussed herein can also improve a functioning of a computing device in a number of additional ways. In some cases, representing the environment and the object(s) in the environment as a top down view can represent a simplified representation of the environment for the purposes of generating prediction probability(ies) and/or selecting between candidate actions. In some cases, the top down view representation can represent the environment without extracting particular features of the environment, which may simplify the generation of the prediction system and subsequent generation of at least one predicted trajectory, intention, or weight. In some cases, evaluating an output by a model(s) may allow an autonomous vehicle to generate more accurate and/or safer trajectories for the autonomous vehicle to traverse an environment. For example, prediction probabilities associated with a first candidate action can be evaluated to determine a likelihood of a collision or a near-collision and may allow the autonomous vehicle to select or determine another candidate action (e.g., change lanes, stop, etc.) in order to safely traverse the environment. In at least some examples described herein, predictions based on top down encodings of the environment in addition to an intended action may minimize (improve) a spread of a probability distribution function associated with the object, yielding safer decision-making of the system. These and other improvements to the functioning of the computer are discussed herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using data represented in an image format). While examples are given in the context of determining intentions of pedestrians and bicycles, the techniques described herein are also applicable to determining attributes of other objects in the environment (e.g., vehicles, skateboarders, animals, etc.).

FIG. 1 is an illustration of an autonomous vehicle (vehicle 102) in an environment 100, in which an example machine learned model may process a top down representation of an environment to determine a discretized representation of the environment. While FIG. 1 describes an autonomous vehicle, in some examples, the behavior prediction techniques described herein may be implemented by other vehicle systems, components, and/or a remote computing device. For example, and as will be described in further detail with regard to FIG. 6, the behavior prediction techniques described herein may be implemented at least partially by or in association with a model component 630 and/or a planning component 624.

In various examples, a vehicle computing system of the vehicle 102 may be configured to detect an object 104 in the environment 100, such as via a perception component (e.g., perception component 622). In some examples, the vehicle computing system may detect the object 104, based on sensor data received from one or more sensors. In some examples, the sensor(s) may include sensors mounted on the vehicle 102, and include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100.

In various examples, vehicle 102 may be configured to transmit and/or receive data from other autonomous vehicles and/or the remote sensors. The data may include sensor data, such as data regarding the object 104 detected in the environment 100. In various examples, the environment 100 may include the remote sensors for traffic monitoring, collision avoidance, or the like. In some examples, the remote sensors may be mounted in the environment to provide additional visibility in an area of reduced visibility, such as, for example, in a blind or semi-blind intersection. For example, an intersection in the environment 100 may be determined to have a blind intersection, where approaching vehicles may not be able to perceive the object 104 and/or other vehicles approaching from the left or right on the intersecting road. The intersection in the environment may thus include a sensor to provide sensor data to an approaching vehicle 102 regarding an object 104, such as a pedestrian approaching a junction.

In various examples, the vehicle computing system may receive the sensor data and may determine a type of object 104 (e.g., classify the type of object), such as, for example, whether the object 104 is a car, a truck, a motorcycle, a moped, a bicyclist, a pedestrian, such as objects 104, or the like. In some examples, the object type may be input into a model to provide an object behavior prediction.

FIG. 1 also depicts the environment 100 as including crosswalks 106A and 106B. In some examples, a machine learned model 108 (e.g., the model 108) may be applied to predict whether the pedestrian 104 will move towards and/or be in the crosswalk 106A or the crosswalk 106B at a future time. In some examples, the machine learned model 108 may determine different behavior predictions for the pedestrian such as determining predicted trajectory 110A and predicted trajectory 110B. The model 108 may, for example, determine the predicted trajectories 110A and 110B based at least in part on receiving input data representing a top down representation 112 and outputting a discretized representation 114 of the environment 100. A vehicle computing system of the vehicle 102 may use the predicted trajectories 110A and 110B to infer an intent of the pedestrian (e.g., whether the pedestrian may approach a destination in the environment 100). Pedestrian trajectories and/or intentions determined by the vehicle 102 may be considered during vehicle planning (e.g., planning component 624) thereby improving vehicle safety as a vehicle navigates in the environment.

Generally, the top down representation 112 can represent an area around the vehicle 102. In some examples, the area can be based at least in part on an area visible to sensors (e.g., a sensor range), a receding horizon, an area associated with an action (e.g., traversing through an intersection), and the like. In some examples, the top down representation 112 may represent a 100 meter×100 meter area around the vehicle 102, although any area is contemplated. The machine learned model 108 can receive data about objects in the environment from the perception component 622 and can receive data about the environment itself from the localization component 620, the perception component 622, and the one or more maps 628. The model 108 can generate a top down view of the environment including objects in the environment (e.g., represented by a bounding box, as discussed herein), semantic information about the object (e.g., a classification type), movement information (e.g., velocity information, acceleration information, etc.), and the like.

In various examples, the top down representation 112 of the environment 100 may be representative of a top down perspective of the environment and may comprise one or more multi-channel image(s) such as a first channel 116, a second channel 118, and a third channel 120. A vehicle computing system can generate or determine the multi-channel image(s) to represent different attributes of the environment with different channel images. For instance, an image having multiple channels, wherein each channel is representative of some information (semantic or otherwise). Generally, one of the channel images 116, 118, and 120 can represent an object position, an object velocity, an object acceleration, an object yaw, an attribute of the object, crosswalk permission (e.g., a crosswalk light or audio state), and traffic light permissibility (e.g., a traffic light state), just to name a few. Examples of generating or determining multi-channel image(s) are discussed in connection with U.S. patent application Ser. No. 16/151,607, entitled "Trajectory Prediction on Top-Down Scenes," and filed Oct. 4, 2018. Application Ser. No. 16/151,607 is herein incorporated by reference, in its entirety. Details of the top down representation 112 are discussed in relation to FIG. 2, and elsewhere.

In some examples, the first channel 116 can represent bounding boxes, locations, extents (e.g., length and width), etc. of the autonomous vehicle 102 and/or the object 104 in the environment. In some examples, the second channel 118 can represent crosswalk permission information (e.g., permission to occupy the crosswalk based on available space and/or a signal). For example, the second channel 118 can illustrate the area available for a pedestrian to travel in a crosswalk, and whether the area is associated with a current crosswalk signal indicating permission for a pedestrian to enter the crosswalk. In some examples, the third channel 120 can represent additional object data or vehicle data, which in this case, corresponds to velocity information 122 (e.g., $V_1$) and direction information 124 (e.g., $D_1$) associated with the object 104. In some examples, the velocity information 122 can comprise an instantaneous velocity, an average velocity, and the like. In some examples, the direction information 124 can comprise an instantaneous direction, an average direction, and the like. Although discussed in the context of velocity, the velocity information 122 can represent information associated with an acceleration (e.g., average over the action, maximum acceleration associated with the action, and the like), distance(s) from another object or vehicle, and the like.

In some examples, the discretized representation 114 of the environment 100 may represent a grid associated with time. For example, the discretized representation 114 can represent a 21×21 grid (or J×K sized grid) representing a 25 meter by 25 meter region (or other size region) around the pedestrian 104. In some examples, the discretized representation 114 may have a center that comprises the pedestrian 104 at a first time and may progress in time as the pedestrian 104 moves from an initial position. Details of the discretized representation 114 are discussed in relation to FIGS. 3 and 4, and elsewhere.

In some examples, the discretized representation 114 comprises multiple cells, such as cell 126 and cell 128. Each cell can comprise a probability that the pedestrian 104 will be at a location of the cell in the future (e.g., a second time after the first time). For example, and as explained in more detail below, the model 108 may determine that the cell 126 is associated with the crosswalk 106A and that the cell 128 is associated with the crosswalk 106B, and output the predicted trajectories 110A and 110B based at least in part on probabilities associated with respective cell locations. In some examples, the cell 126 and the cell 128 are associated with a respective location that represents an offset from a first position of the object 104 at a first time based on a location of the object at a previous time before the future time (e.g., shown as shaded cells in FIG. 1). For instance, in FIG. 1, shading of a cell may indicate a possible path of the pedestrian from a current position to a location in the discretized representation 114, such as cell 126, which is associated with a destination, crosswalk 106A.

In some examples, the predicted trajectories 110A and 110B may be determined by the model 108 based at least in part on the interpolating a position of the object 104 at the first time and a location associated with a probability at the second time. For example, the model 108 may interpolate a position of the object 104 at different times across different areas of the discretized representation 114.

In some instances, the machine learning model 108 can output a plurality of discretized representations, wherein a discrete representation of the plurality of discretized representations can represent probability predictions associated with the object at a particular time in the future (e.g., 0.5 second, 1 second, 3 seconds, 5 seconds, 10 seconds, etc.).

In some examples, the model 108 may determine a weight (e.g., a probability) to indicate whether the pedestrian 104 will use the predicted trajectory 110A or the predicted trajectory 110B. Details of determining a weight are discussed in FIG. 3, and elsewhere. The model 108 may send the predicted trajectories and the associated weights to an additional model that will determine an intent of the pedestrian 104. However, in some examples, functionality provided by the additional model may be performed by the model 108. Details of a model used to determine an intent of the pedestrian 104 is discussed in relation to FIG. 5, and elsewhere.

In various examples, a planning component and/or a perception component of the vehicle computing system may determine one or more candidate trajectories for an autonomous vehicle based on the output (e.g., intent, predicted trajectories, weights etc.) from one or more of the model 108 and/or the additional model. In some examples, the candidate trajectories may include any number of potential paths in which the vehicle 102 may travel from a current position (e.g., at the time of perception) and/or based on a direction of travel. In some examples, a potential path for one of the pedestrian 104 may include remaining stationary. In such an example, the corresponding trajectory may represent little to no motion. In some examples, the number of trajectories may vary depending on a variety of factors, such as the classification of the object (e.g., type of object), other stationary and/or dynamic objects, drivable surfaces, etc. In some examples, the one or more candidate trajectories may be determined utilizing machine learning techniques.

Figure 2:
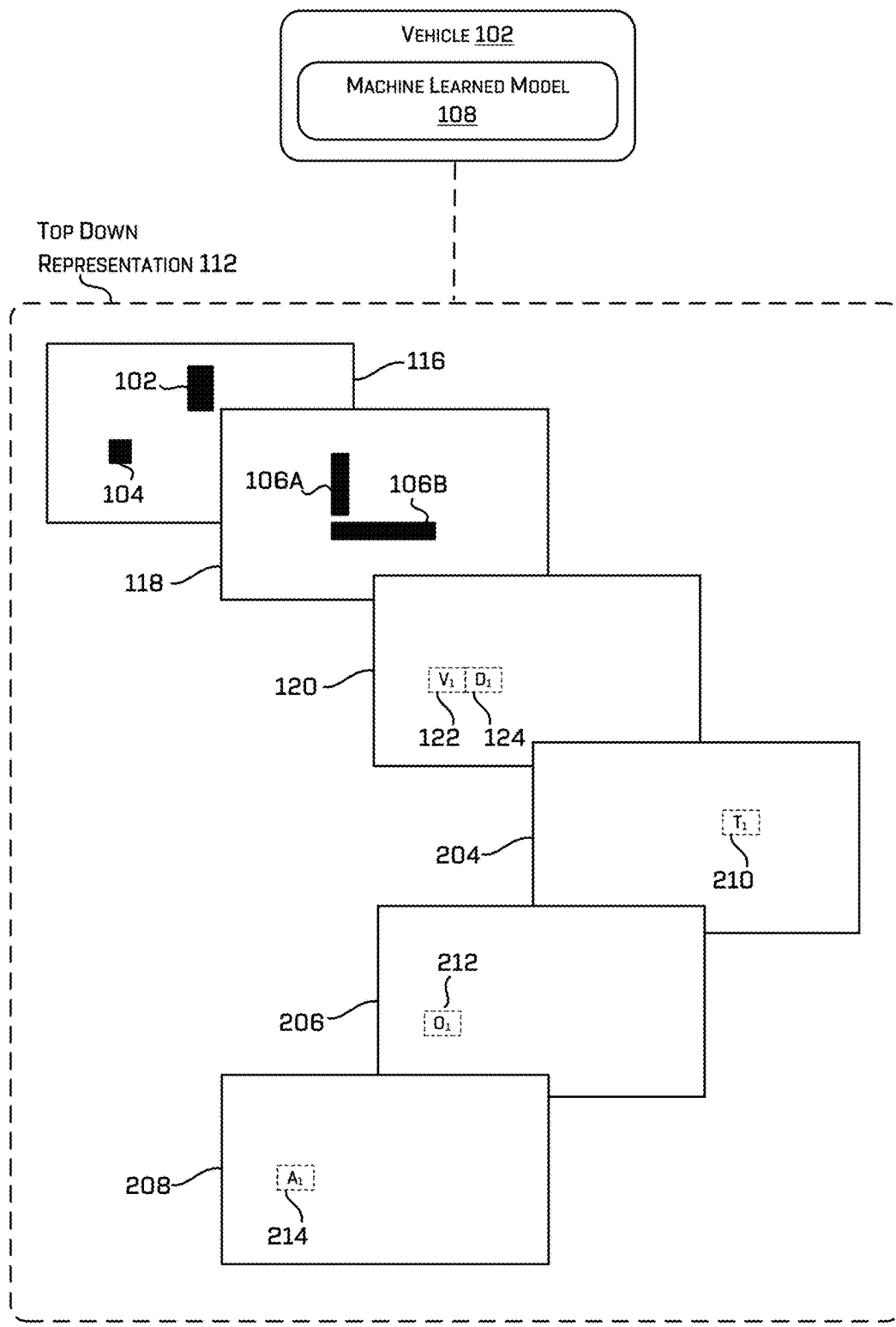
FIG. 2 is an example top down representation of an environment usable by a machine learned model to implement techniques described herein.

FIG. 2 is an example top down representation of an environment usable by a machine learned model to implement techniques described herein. In at least one example, a vehicle computing system of the vehicle 102 may implement the machine learned model 108 to process data representing the top down representation 112 of the environment. In this way, the model 108 may use the data to better capture context of the vehicle 102 versus approaches that do not use a top down view.

As mentioned above, the top down representation 112 comprises multi-channel images including the first channel 116, the second channel 118, and the third channel 120. As illustrated in FIG. 2, the top down representation 112 further comprises, a fourth channel 204, a fifth channel 206, and a sixth channel 208.

In some examples, the fourth channel 204 can represent traffic light permissibility information (e.g., a traffic light state showing permission to enter an intersection with other vehicles and pedestrians) which corresponds to traffic information 210 (e.g., $T_1$). In some examples, multiple traffic lights or traffic signals may be associated with the fourth channel such that the fourth channel 204 may include additional traffic information for each traffic light or signal in the environment. In some examples, the traffic information 210 can be used by the model 108 in combination the crosswalk permission of the second channel 118 to determine when a crosswalk is crossable given not only the crosswalk signal or light, but also a traffic light (e.g., to know if cars have the right of way relative to the crosswalk).

In some examples, the fifth channel 206 can represent an orientation (e.g., a roll, pitch, yaw) of the object 104 which corresponds to orientation information 212 (e.g., $O_1$). In some examples, the sixth channel 208 can represent attributes (e.g., an object action like running, walking, crouching, object location history, object velocity history, object direction history, and so on) of an object which corresponds to attribute information 214 (e.g., $A_1$). In some examples, the attributes of the object may include historical behaviors relative to specific areas of the environment. Object attributes may be determined by a vehicle computing system implementing one or more models, and may include one or more of: an action, a position, or a subclassification of the object. For instance, an attribute of the object 104 may include the pedestrian looking at a device, looking at the vehicle 102, sitting, walking, running, entering a vehicle, existing vehicle, and the like. In some examples, the attribute information 214 may comprise an object type, such as a pedestrian, a vehicle, a moped, a bicycle, and so on.

In some examples, an additional channel of the top down representation 112 may represent a drivable surface for the vehicle 102, weather characteristics, and/or environmental characteristics.

The top down representation 112 of the environment represented by the data may also improve predictions about a direction and/or a destination that a pedestrian or other object may be associated with (e.g., facing and/or moving towards) by providing more information about surroundings of the pedestrian such as whether another pedestrian is blocking a path of the pedestrian. For instance, by including the third channel 120, velocity information 122 and direction information 124 can be processed by the model 108.

In some examples, an input to the model 108 can comprise data associated with an individual image or cropped image frame of an object represented in sensor data of the vehicle. As the vehicle navigates the environment, additional images are captured for different times and provided as the input to the machine learned model 108. In some examples, image frames may be cropped to a same scale such that each image comprises a same size (a same aspect ratio, etc.) when included in the input of the model 108.

Figure 3:
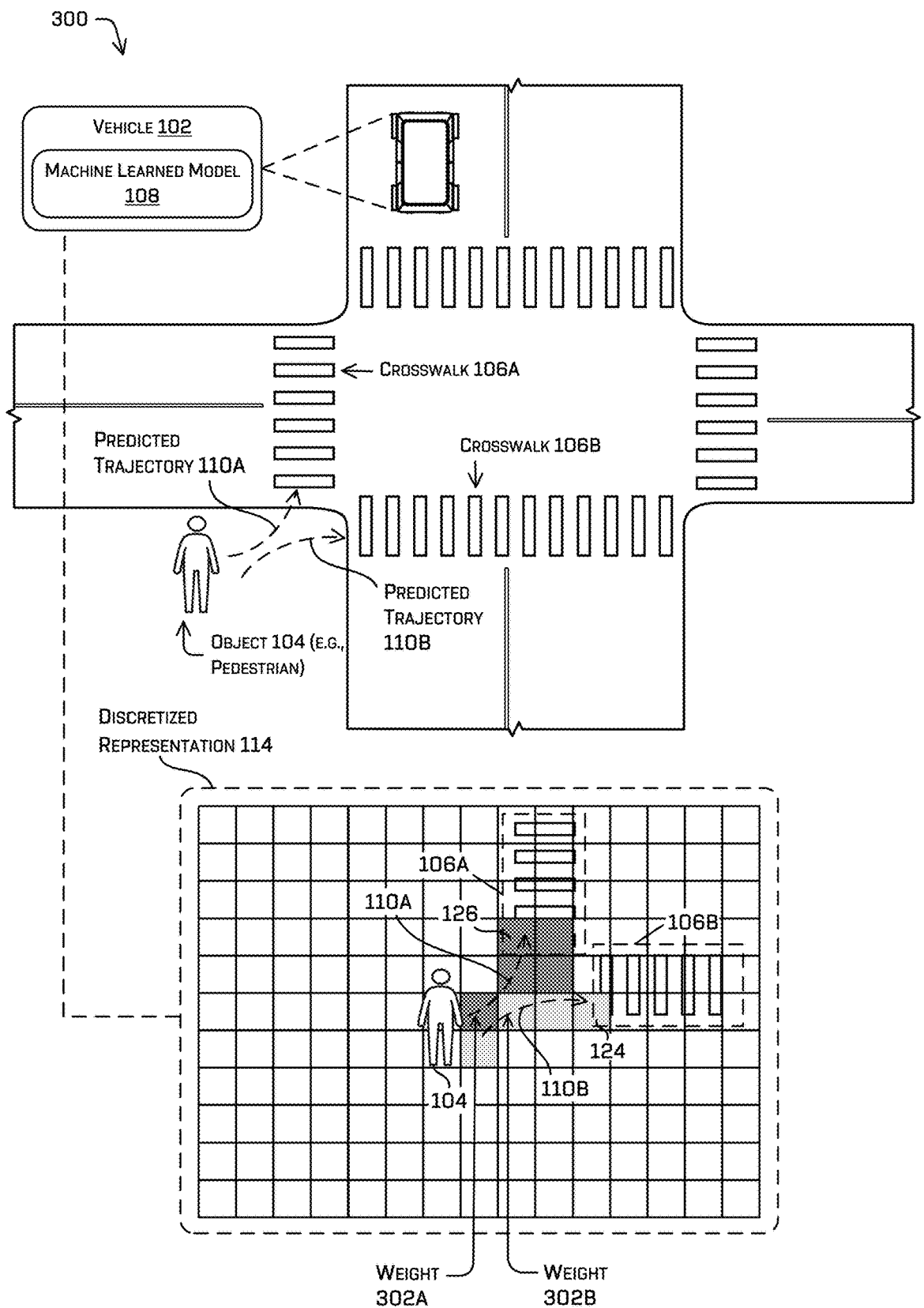
FIG. 3 is an illustration of an autonomous vehicle in an environment, in which an example machine learned model may determine a discretized representation of the environment.

FIG. 3 is an illustration of an example autonomous vehicle (vehicle 102) in an environment 300, in which an example machine learned model may determine a discretized representation of the environment. In at least one example, a vehicle computing system of the vehicle 102 may implement the machine learned model 108 to output the discretized representation 114 of the environment 300.

As mentioned above, in some examples, the discretized representation 114 comprises multiple cells, such as the cells 126 and 128 that comprise a respective probability that the pedestrian 104 will be at a respective location of the cell in the future. As illustrated in FIG. 3, the model 108 may determine the predicted trajectory 110A and a weight 302A (e.g., a first weight) to indicate whether the pedestrian 104 will travel to a location corresponding to the cell 128 and determine the predicted trajectory 110B and a weight 302B (e.g., a second weight) to indicate whether the pedestrian 104 will travel to a location corresponding to the cell 126. In some examples, the vehicle computing system of the vehicle 102 may determine a trajectory and/or a weight for the pedestrian 104 based on receiving the discretized representation 114 from the model 108.

In some examples, the location of the cell in the discretized representation 114 may represent an offset (e.g., a prediction of where an object will be at a future time). For example, the discretized representation 114 may enable offset techniques to determine a location of the pedestrian 104 at, for instance, 4 seconds in the future, and determine the offset from a current position at present time to a location associated with a cell at the future time. In such examples, the model 108 (or other component of the vehicle computing system) may determine internal points, or waypoints, based at least in part on the offset. By knowing the destination of the object using offset techniques, the model 108 may provide predicted trajectories for use in vehicle planning. In some examples, the predicted trajectory (e.g., 110A or 110B) may identify not only a direction to a location of a cell, but also identify a distance to the cell based on the discretized representation 114.

In some examples, the predicted trajectories 110A and 110B may be determined by the model 108 based at least in part on interpolating a position of the pedestrian 104 at a first time and a location associated with a probability at the second time (e.g., a location of the cell 126 or the cell 128). For example, the model 108 may interpolate a position of the pedestrian 104 at different times across different areas of the discretized representation 114, and determine one or more predicted trajectories based on the interpolation. In such examples, interpolating may comprise estimating a set of datapoints from a change in position of the pedestrian 104 over a time period. In some examples, the model 108 may implement linear interpolation algorithms to determine a predicted trajectory.

In some examples, the first weight or the second weight may be determined based at least in part on an aggregate of probabilities associated with the one or more cells. For instance, a probability (e.g., a classification probability) for each cell overlapping or intersecting the predicted trajectory 110A may be combined to determine the weight 302A. In some examples, the model 108 may determine the first weight or the second weight based at least in part on an average of the probabilities for each cell overlapped or intersected by a predicted trajectory of the object. In various examples, a cell may be considered overlapped or intersected with a respective trajectory based on a pixel associated with the object is in a threshold range of a lateral boundary of a cell.

By way of example and not limitation, the weight 302A may comprise a value of 60% while the weight 302B may comprise a value of 40%. Thus, the pedestrian 104 has a 60% likelihood of using the predicted trajectory 110A to arrive at the cell 126 and a 40% likelihood of using the predicted trajectory 110B to arrive at the cell 128. The trajectories and weights output by the model 108 may be sent to a planning component of the vehicle 102 for use in planner considerations (e.g., determining an action by the vehicle 102).

In some examples, the model 108 may determine that the location of the cell 128 is associated with the crosswalk 106B and that the cell 126 is associated with the crosswalk 106A. For instance, the model 108 may receive map data and/or sensor data and determine a semantic destination that is associated with the location of the cell 128 and the cell 126.

In various examples, the vehicle computing system may store sensor data associated with actual location of an object and use this data as training data to train the model 108. For example, stored sensor data may be retrieved by the model 108 and be used as input data to identify cues of an object (e.g., identify a feature, an attribute, or a pose of the object). In some examples, the vehicle computing system may provide the data to a remote computing device (e.g., a computing device separate from vehicle computing system) for data analysis. In such examples, the remote computing system may analyze the sensor data to determine one or more labels for images, an actual location, velocity, direction of travel, or the like of the object. In some such examples (e.g., an example in which an intent of a pedestrian is determined), ground truth positions of the orientation over the course of the log may be determined (either hand labelled or determined by another machine learned model) and such ground truth positions may be used to determine an actual intent of the pedestrian (e.g., did the pedestrian remain standing, cross the road, begin/continue running, begin/continue walking, etc.). In some examples, corresponding data may be input into the model to determine an output (e.g., an intent, a trajectory, a weight, and so on) and a difference between the determined output and the actual action by the object may be used to train the model.

Figure 4:
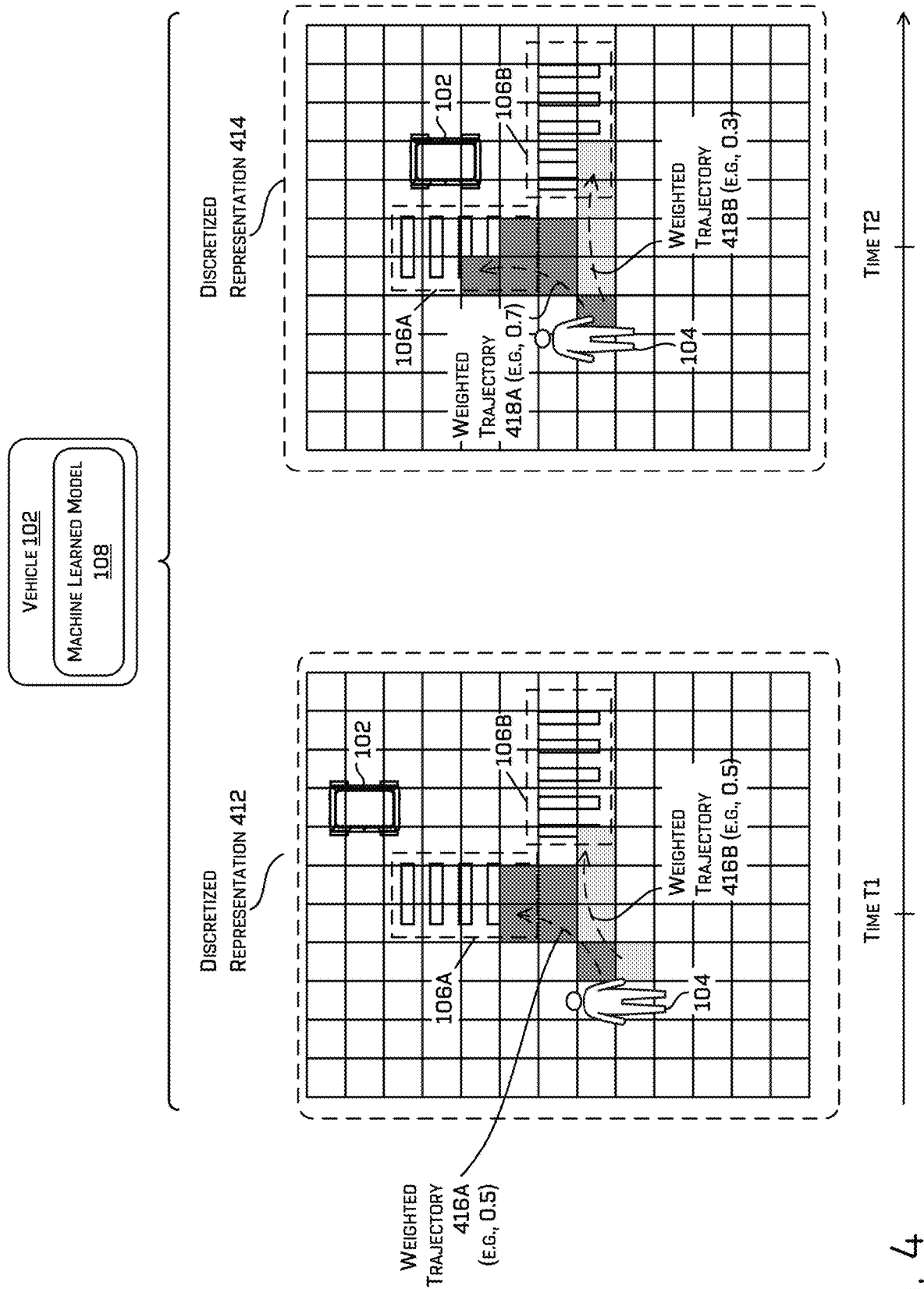
FIG. 4 is an example discretized representation of an environment output by an example machine learned model.

FIG. 4 depicts example discretized representations of an environment output by an example machine learned model. In at least one example, a vehicle computing system of the vehicle 102 may implement the machine learned model 108 to output a discretized representation 412 of the environment 300 at a first time, T1, and a discretized representation 414 of the environment 300 at a second time, T2, after the first time T1.

In the example of FIG. 4, the discretized representation 412 comprises a location of the vehicle 102, a location of the pedestrian 104, and weighted trajectories 416A and 416B for the pedestrian to arrive at the crosswalks 106A and 106B, respectively at time T1. The weighted trajectory 416A is representative of the predicted trajectory 110A and the weight 302A. Accordingly, the weighted trajectory 416A indicates a direction of the pedestrian 104, an acceleration the pedestrian 104, a first likelihood of the pedestrian 104 arriving at a first destination (e.g., the crosswalk 106A) at a second time, and a second likelihood of the pedestrian 104 arriving at a second destination (e.g., the crosswalk 106B) at the second time. By way of example, the weighted trajectory 416A and the weighted trajectory 416B are associated with a value 0.5 (other values, symbols, and expressions to represent a probability are contemplated other than a numerical value) to indicate that the pedestrian has an equal probability of using either the weighted trajectory 416A or the weighted trajectory 416B. For instance, the weighted trajectory 416A and the weighted trajectory 416B may be associated with a relative priority (e.g., low, medium, high) and/or other priorities (e.g., first, second, third, etc.). Information about the weighted trajectories 416A and 416B may be sent by the model 108 to the vehicle computing system of the vehicle 102 for planner considerations.

As illustrated in FIG. 4, the discretized representation 414 comprises a different location of the vehicle 102 at the time T2 than at time T1 to indicate that the vehicle changed location. For instance, the vehicle computing system may receive additional input data corresponding to the time T2, and determine the discretized representation 414 to represent changes in location of the pedestrian 104 and other objects in the environment. In some examples, the model 108 determines the weighted trajectories 418A and 418B for the pedestrian to arrive at the crosswalks 106A and 106B, respectively, at time T2. The weighted trajectories 418A and 418B may be representative of new predicted trajectories and associated weights for the pedestrian 104 at time T2. By way of example, the weighted trajectory 418A indicates that the pedestrian 104 has a 0.7 weight of arriving at the crosswalk 106A, which is not surprising consider the vehicle has moved closer to the pedestrian 104 (which need not necessarily have moved) and processed new input data for a more accurate trajectory prediction (compared to a previous time). As shown in FIG. 4, the weighted trajectory 418B is associated with a value 0.3 to indicate that the pedestrian has a lower probability of arriving at the crosswalk 106B than the crosswalk 106A.

In some instances, the machine learning model 108 can output a plurality of weighted trajectories that can represent probability predictions associated with an object and one or more destinations at a particular time in the future (e.g., 0.5 second, 1 second, 3 seconds, 5 seconds, 10 seconds, etc.). In this case, the discretized representation 414 may determine the weighted trajectories 418A and 418B for a time in the future, such as 2 seconds.

In some examples, the time period between time T1 and time T2 can vary, and may represent 1 second intervals at 5 Hz (5 frames of input).

Figure 5:
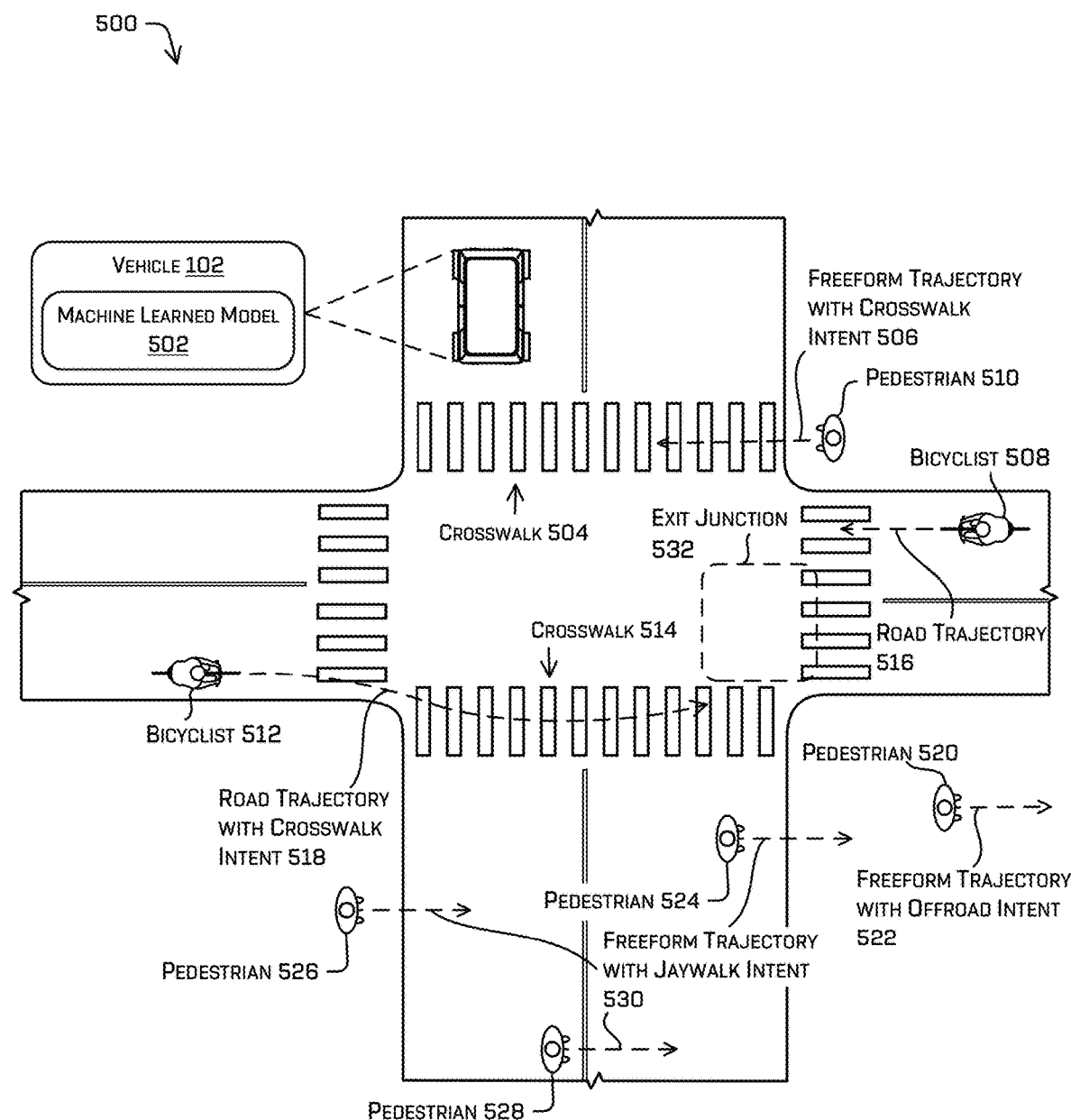
FIG. 5 is an illustration of an autonomous vehicle in an environment, in which an example machine learned model may process data to determine an intent for a trajectory or an object.

FIG. 5 is an illustration of an autonomous vehicle in an environment 500, in which an example machine learned model may process data to determine an intent for a trajectory, a trajectory type, or an object. The vehicle 102 may comprise a machine learned model 502 configured to determine an intent of an object in the environment 500. While described as a separate machine learned model, in some examples, the behavior prediction techniques described herein may be implemented by other vehicle systems, components, and/or computing devices. For example, the behavior prediction techniques described herein may be implemented at least partially by or in association with a model component 630 and/or a planning component 624 of a vehicle computing system 604.

In some examples, the machine learned model 502 (e.g., the model 502) may receive a trajectory and a weight as an input, such as from the model 108, and further receive input data comprising map data representing one or more features (e.g., destinations, roads, objects, and so on) of the environment 500. In some examples, multiple trajectories and weights from a first model may be received by the model 502 for processing.

In some examples, the model 502 may receive a trajectory and a weight from a planning component of the vehicle computing system. For instance, the planning component may send a candidate trajectory, and a weight indicating a likelihood for the candidate trajectory to be used by the vehicle 102. In some examples the trajectory from the planning component may be based at least in part on regression techniques (e.g., techniques that estimate or measure a relationship between two or more variables). In some examples, the model 502 may output an intent for the candidate trajectory based at least in part on the weight, and send an indication of the output to the vehicle 102. Additional details of generating trajectories using regression techniques are described in U.S. patent application Ser. No. 16/363,541, filed Mar. 25, 2019, entitled "Pedestrian Prediction Based On Attributes," which is incorporated herein by reference.

In some example, the model 502 may receive a trajectory and a weight from the planning component, and also receive a trajectory and a weight from the model 108, and determine one or more intents to associate with the one or more trajectories received from the planning component and/or the model 108. In various examples, the trajectory from the planning component (e.g., a first trajectory) may be associated with a different semantic destination than a semantic destination associated with the second trajectory. In some examples, the first semantic destination may comprise a first region in the environment of the vehicle 102, and the second semantic destination may comprise a second region in the environment of the vehicle 102. In some examples, the trajectory from the model 108, may be determined based at least in part on classification techniques (e.g., techniques that map an input to a class or category). By determining the trajectory by the model 108 based on classification techniques, determinations can be made that reduce inaccurate trajectories (e.g., collapse to a common trajectory) versus some non-classification approaches. In some example, the model comprises a machine learned model that further comprises a UNet backbone and a softmax activation output. The UNet backbone may, for instance, improve resolution of an output by the model 502, particularly when receiving two or more inputs from two or more sources (e.g., a predicted trajectory from a first model and a candidate trajectory from a second model) and outputs with similar resolution are desired.

In some examples, the model 502 may receive an indication of an object and/or an object type detected by the vehicle computing system. For instance, the vehicle computing system may provide the model 502 with data indicating that an object is a pedestrian (such as pedestrians 510, 520, 524, 526, and 528), a bicycle (such as bicyclists 508 and 512), a vehicle, an animal, and so on, and in some instances, also or instead indicate a weighted object type (e.g., an object is 80% probability of being a pedestrian and 20% probability of being a bicycle).

The model 502 may, in some examples, process the map data to determine one or more destinations, such as crosswalks 504 and 514, in the environment 500 associated with the received trajectories. In some examples, the destination may comprise any one of: a road, a sidewalk, a bicycle lane, a road segment, a crosswalk, a building, a bus lane, and so on. For example, the model may be used to determine whether an object, such as a bus travelling along a road will pull over into a bus lane at a future time, or remain in the road and not pull into the bus lane (e.g., a lane adjacent a road to reach passengers).

In some examples, the model 502 may determine an intent to associate with the trajectory based at least in part on the destination associated with the trajectory. For instance, based on the determined destination, the model 502 may output data indicating an intent for the trajectory. For example, the one or more intentions determined by the model 502 may be associated with a trajectory and/or a trajectory type output by the model 502. For instance, the model may determine a location of an object relative to a road based on map data indicating a road segment, and use the location to determine the trajectory type as at least one of: a road trajectory type or a freeform trajectory type. For example, a road trajectory type may be associated with the object based on the object's location being within a road segment (as determined by map data), a threshold distance of a road (e.g., bounds of a lane). In some examples, the freeform trajectory type may be associated with the object that may move independent of road geometry (e.g., inside the road segment, outside the road segment or a threshold distance from the road segment). An object intention may vary according to a location of the object relative to a road boundary. In some examples, a pedestrian may have a freeform trajectory rather than a road trajectory (e.g., due to a speed threshold not being met) when in a road to give the model 502 more flexibility to predict movement by the pedestrian away from the road (e.g., predict more possible direction the pedestrian may move versus the road trajectory which may limit predictions, for instance, that the pedestrian will head in a direction away from the road).

In some examples, the model 502 may determine an intent of an object in an environment based at least in part on a proximity of the object to a region in the environment. For example, a jaywalk intent may be determined based on the object being other than a vehicle and being inside region such as a road. In another illustrative example, the region may correspond to a crosswalk, sidewalk, bicycle lane, and so on. In some examples, the region in the environment may comprise a road segment associated with map data representing the environment.

Generally, the model 502 may determine whether an object intends to enter a crosswalk (e.g., crosswalk intention), travel outside a crosswalk and in a road (e.g., jaywalk intention), and/or travel outside a crosswalk and outside a road (e.g., offroad intention). For example, the model may determine that an intent comprises at least one of: an intent of an object in an environment of the autonomous vehicle to travel along a road segment, an intent of the object to travel outside a proximity of the road segment, an intent of the object to travel within a crosswalk, or an intent of the object to travel outside a boundary of the crosswalk.

In various examples, the machine learned model 502 may associate an intent of the object with a trajectory type. By way of example and not limitation, the bicyclist 508 may be associated with a road trajectory 516 and the bicyclist 512 may be associated with a road trajectory having a crosswalk intent 518. FIG. 5 also depicts that the machine learned model 502 may associate the pedestrian 510 (or trajectory for the pedestrian) with freeform trajectory having a crosswalk intent 506, the pedestrian 520 with a freeform trajectory having an offroad intent, and the pedestrians 524, 526, and 528 with a freeform trajectory having a jaywalk intent 530.

In some examples, the model 502 may associate an object (or trajectory of the object) with multiple intents, and output a weight associated with each intent for the object or trajectory. For instance, the pedestrian 520 may have a freeform trajectory with offroad intent 522 and, for illustrative purposes, a weight of 0.9 to indicate a 90% probability that the pedestrian has an offroad intent. Here, the model 502 may also output an indication that the freeform trajectory of the pedestrian 520 has a weight of 0.1 to indicate a 10% probability that the pedestrian 520 has a jaywalking intent (e.g., pedestrian 520 changes direction and enters the road). According, weighted intents output by the model 502 may be associated with the object or the trajectory.

The model 502 may also or instead be configured to determine a trajectory for an exit junction 532 (e.g., a change between a road and another location such as a crosswalk). For instance, the model 502 (or another model) be configured to receive a trajectory as an input and output a trajectory specific for the exit junction 532 (e.g., an end of the destination associated with an intent). As illustrated in FIG. 5, the model 502 (or another model) may be configured to receive a trajectory as an input and output a trajectory for the bicyclist 512 specific for the exit junction 532 for when the bicyclist 512 returns to the road at a future time after exiting the crosswalk 514.

In some examples, the vehicle computing system may determine that one of a first weight associated with a first trajectory or a second weight associated with a second trajectory is higher than the other of the first weight and the second weight. For instance, the first trajectory may be associated with the candidate trajectory from the planning component, and the second trajectory may be associated with a predicted trajectory from the model 108. In some example, the vehicle computing system may perform at least one of: responsive to determining that the first weight is higher than the second weight, controlling an autonomous vehicle in an environment based at least in part on the first trajectory, or responsive to determining that the second weight is higher than the first weight, controlling the autonomous vehicle in the environment based at least in part on the second trajectory.

Generally, output(s) (e.g., weights, trajectories, trajectory types, and/or intentions) by the model 502 and/or the model 108 may be communicated with a planning component of a vehicle which may in turn determine a candidate trajectory for the vehicle based at least in part on the output(s). The planning component may, for example, determine the candidate trajectory differently whether the object is associated with a road trajectory type as opposed to a freeform trajectory type (each type may be associated with different algorithm, parameters, and/or settings usable by the vehicle computing system to generate actions for the vehicle 102. By identifying the trajectory type, the planning component may, for instance, implement a different set of algorithms or parameters when determining the candidate trajectory. This can lead to the planner generating trajectories with more detail more quickly than when the planner does not process the trajectory type.

Figure 6:
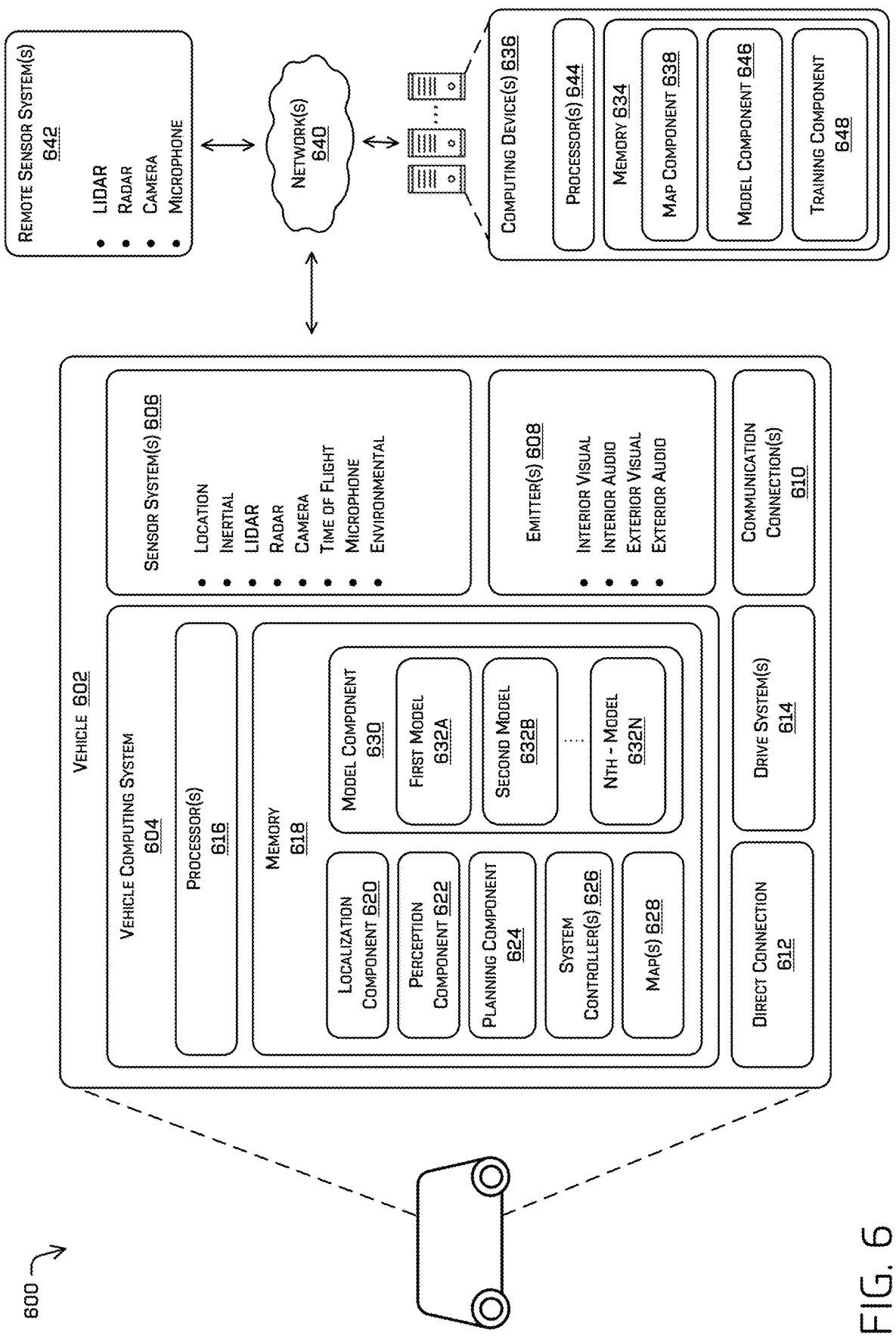
FIG. 6 is a block diagram of an example system for implementing the techniques described herein.

FIG. 6 is a block diagram of an example system 600 for implementing the techniques described herein. The vehicle 602 may include a vehicle computing system 604, one or more sensor systems 606, one or more emitters 608, one or more communication connections 610, at least one direct connection 612, and one or more drive system(s) 614.

The vehicle computing system 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing system 604 stores a localization component 620, a perception component 622, a planning component 624, one or more system controllers 626, one or more maps 628, and a model component 630 including one or more models, such as a first model 632A, a second model 632B, up to an Nth model 632N (collectively "models 632"), where N can be any integer greater than 1. Though depicted in FIG. 6 as residing in the memory 618 for illustrative purposes, it is contemplated that the localization component 620, a perception component 622, a planning component 624, one or more system controllers 626, one or more maps 628, and/or a model component 630 including the models 632 may additionally, or alternatively, be accessible to the vehicle 602 (e.g., stored on, or otherwise accessible by, memory remote from the vehicle 602, such as, for example, on memory 634 of a remote computing device 636).

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 628 and/or map component 638, and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some examples, the planning component 624 may include a prediction component to generate predicted trajectories of objects (e.g., objects) in an environment. For example, a prediction component may generate one or more predicted trajectories for objects within a threshold distance from the vehicle 602. In some examples, a prediction component may measure a trace of an object and generate a trajectory for the object based on observed and predicted behavior.

In at least one example, the vehicle computing system 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, and/or the planning component 624 to determine a location of the vehicle 602, detect objects in an environment, generate routes, determine actions and/or trajectories to navigate within an environment.

In some examples, the one or more maps 628 may be stored on a remote computing device(s) (such as the computing device(s) 636) accessible via network(s) 640. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the vehicle computing system 604 may include a model component 630. The model component 630 may be configured to determine a predicted trajectory of an object, a weight associated with a predicted trajectory, an intent of an object, an intent of a trajectory, and/or an intent of a trajectory type, such the model 108 of FIG. 1 and the model 502 of FIG. 5. In various examples, the model component 630 may receive data representing a top down view of the environment. In some examples, the model component 630 may receive environment characteristics (e.g., environmental factors, etc.) and/or weather characteristics (e.g., weather factors such as snow, rain, ice, etc.) from the perception component 622 and/or the sensor system(s) 606. While shown separately in FIG. 6, the model component 630 could be part of the perception component 622, the planning component 624, or other component(s) of the vehicle 602.

In various examples, the model component 630 may send outputs from the first model 632A, the second model 632B, and/or the Nth model 632N that are used by the planning component 624 to generate one or more candidate trajectories (e.g., direction of travel, speed, etc.) for the vehicle 602. In some examples, the planning component 624 may determine one or more actions (e.g., reference actions and/or sub-actions) for the vehicle 602. In some examples, the model component 630 may be configured to output a discretized representation usable by the vehicle computing system 604 to determine a trajectory and a weight for an object at a future time. In some examples, the trajectory may be based at least in part on a cell of the discretized representation. In some examples, the planning component 624 may be configured to determine the actions that are applicable to the environment, such as based on environment characteristics, weather characteristics, or the like.

In some examples, the first model 632A, the second model 632B, and/or the Nth model 632N may be configured for different objects. For instance, the first model 632A may be implemented by the vehicle computing system 604 to determine an intent for a pedestrian and the second model 632B may be implemented to determine an intent for a bicyclist.

In various examples, the model component 630 may utilize machine learning techniques to determine behavior predictions of an object in an image depicting an environment around a vehicle and/or determine behavior predictions of the object in the environment, as described with respect to FIGS. 1-5 and elsewhere. In such examples, machine learning algorithms may be trained to determine one or more trajectories, weights, and/or intents of an object relative to the vehicle in the environment.

In some examples, the model component 630 may determine a predicted trajectory or an intent of an object (e.g., infer an intent of the object) based on a discretized representation of an environment. In some examples, the model component 630 may be trained to learn object behaviors based at least in part on a pose or a previous behavior of the object, and in some instances, how the pose or behavior changes over time. Thus, once trained the model component 630 may determine an intent of the object from fewer images, or a single image, much like a driver can tell if an object will change direction or velocity based on subtle features of the object.

In various examples, the model component 630 may determine a weight based at least in part on probabilities associated with the one or more cells in a discretized representation. For instance, the model component 630 may identify which of, for instance, 400 possible classification for each cell, and aggregate, sum, or otherwise combine the probabilities over each cell associated with a predicted trajectory of the object. In such examples, the model 108 may map cells of the discretized representation to an intent class.

As can be understood, the components discussed herein (e.g., the localization component 620, the perception component 622, the planning component 624, the one or more system controllers 626, the one or more maps 628, the model component 630 including the one or more models, such as a first model 632A, a second model 632B, up to an Nth model 632, are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 618 (and the memory 634, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing system 604. Additionally, or in the alternative, the sensor system(s) 606 may send sensor data, via the one or more networks 640, to the one or more computing device(s) 636 at a particular frequency, after a lapse of a predetermined period of time, in near real-time, etc. In some examples, the model component 630 may receive sensor data from one or more of the sensor system(s) 606.

The vehicle 602 may also include one or more emitters 608 for emitting light and/or sound. The emitters 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audi-bly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 636, other nearby vehicles, etc.) and/or one or more remote sensor system(s) 642 for receiving sensor data. The communication connection(s) 610 also enable the vehicle 602 to communicate with a remote teleoperations computing device or other remote services.

The communication connection(s) 610 may include physical and/or logical interfaces for connecting the vehicle computing system 604 to another computing device or a network, such as network(s) 640. For example, the communication connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the planning component 624, the one or more system controllers 626, the one or more maps 628, and the model component 630, may process sensor data, as described above, and may send their respective outputs, over the one or more network(s) 640, to the computing device(s) 636. In at least one example, the localization component 620, the perception component 622, the planning component 624, the one or more system controllers 626, the one or more maps 628, and the model component 630 may send their respective outputs to the remote computing device(s) 636 at a particular frequency, after a lapse of a predetermined period of time, in near real-time, etc.

In some examples, the vehicle 602 may send sensor data to the computing device(s) 636 via the network(s) 640. In some examples, the vehicle 602 may receive sensor data from the computing device(s) 636 and/or remote sensor system(s) 642 via the network(s) 640. The sensor data may include raw sensor data and/or processed sensor data and/or representations of sensor data. In some examples, the sensor data (raw or processed) may be sent and/or received as one or more log files.

The computing device(s) 636 may include processor(s) 644 and a memory 634 storing the map component 638, a model component 646, and a training component 648. In some examples, the map component 638 may include functionality to generate maps of various resolutions. In such examples, the map component 638 may send one or more maps to the vehicle computing system 604 for navigational purposes. In some examples, the model component 646 may be configured to perform functionality similar to the model component 630. In various examples, the model component 646 may be configured to receive data from one or more remote sensors, such as sensor system(s) 606 and/or remote sensor system(s) 642. In some examples, the model component 646 may be configured to process the data and send processed sensor data to the vehicle computing system 604, such as for use by the model component 630 (e.g., the first model 632A, the second model 632B, and/or the Nth model 632N). In some examples, the model component 646 may be configured to send raw sensor data to the vehicle computing system 604.

In some instances, the training component 648 can include functionality to train a machine learning model to output features of an object and/or attributes of the object. For example, the training component 648 can receive a set of images (e.g., one or more images) that represents an object traversing through an environment for a period of time, such as 0.1 milliseconds, 1 second, 3, seconds, 5 seconds, 7 seconds, and the like. At least a portion of the set of images can be used as an input to train the machine learning model. As a non-limiting example, a first set (e.g., 3, 4, 5, or more) of a sequence of images may be input into the machine learned model. A second set of images (or attribute information associated therefrom—e.g., by extracting attributes from the images) in the sequence of images immediately preceding the first set may then be used as ground truth for training the model. Thus, by providing images of where objects traverse an environment, the training components 648 can be trained to output features of an object and/or attributes of the object, as discussed herein.

In some examples, the training component 648 can include training data that has been generated by a simulator. For example, simulated training data can represent examples where a vehicle collides with an object in an environment or nearly collides with an object in an environment, to provide additional training examples.

Additional details of the training component 648 and examples of data for training are discussed below in connection with FIG. 3, as well as throughout this disclosure.

The processor(s) 616 of the vehicle 602 and the processor(s) 644 of the computing device(s) 636 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 634 are examples of non-transitory computer-readable media. The memory 618 and memory 634 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and memory 634 may include at least a working memory and a storage memory. For example, the working memory may be a high-speed memory of limited capacity (e.g., cache memory) that is used for storing data to be operated on by the processor(s) 616 and 644. In some instances, the memory 618 and memory 634 may include a storage memory that may be a lower-speed memory of relatively large capacity that is used for long-term storage of data. In some cases, the processor(s) 616 and 644 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa. For instance, either the vehicle 602 and the computing device(s) 636 may perform training operations relating to one or more of the models described herein.

Figure 7:
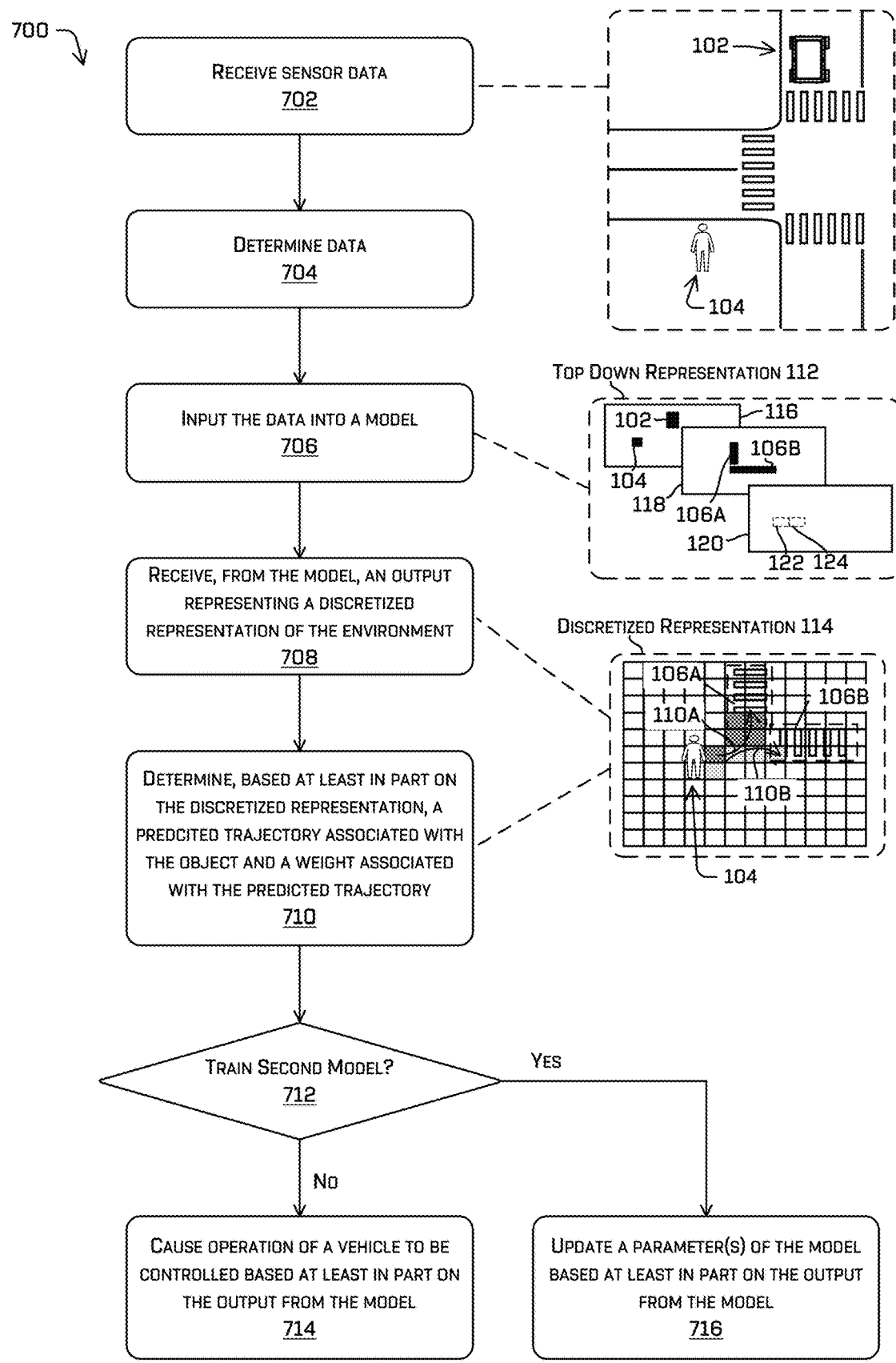
FIG. 7 is a flowchart depicting an example process for determining a predicted trajectory and a weight using different models.
Figure 8:
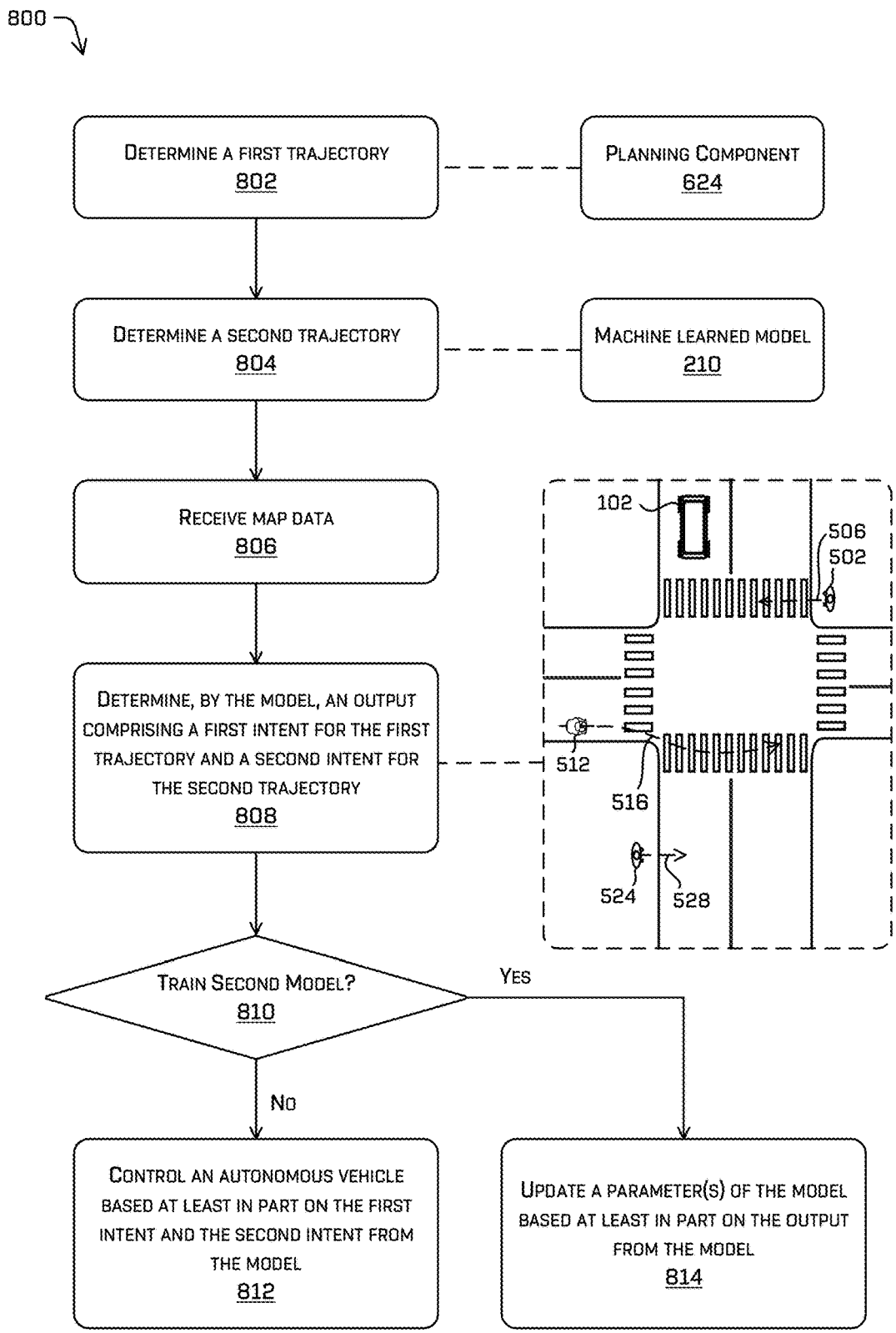
FIG. 8 is a flowchart depicting an example process for determining an intent to associate with a trajectory or a trajectory type using different models.

FIGS. 7 and 8 illustrate example processes in accordance with embodiments of the disclosure. Some or all of the process 700 and 800 may be performed by one or more components in FIG. 6, as described herein. For example, some or all of process 700 and 800 may be performed by the vehicle computing system 604 and/or the computing device(s) 636. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 7 is a flowchart depicting an example process 700 for determining a predicted trajectory and a weight using different models.

At operation 702, the process may include receiving sensor data by a vehicle computing system. For instance, the vehicle computing system 604 may receive the sensor data from the perception component 622. The sensor data may represent an object (e.g., the object 104 of FIG. 1) detected in an environment around a vehicle, such as the vehicle 102. In some examples, the sensor data may be received from one or more sensors on the vehicle and/or from one or more remote sensors. In some examples, the operation 702 can include capturing sensor data using a plurality of sensors and fusing or combining the sensor data into a detail and informative representation of the environment.

At operation 704, the process may include determining data by the vehicle computing system. For instance, the vehicle computing system 604 may determine data representing a top down view of the environment (e.g., the top down representation 112) and an object (e.g., object 104) in the environment. The data may comprise sensor data associated with a sensor of a vehicle in the environment, map data, and/or data from another data source which may be encoded into a top-down representation. Examples of such data are discussed throughout this disclosure.

At operation 706, the process may include inputting the data into a model of the vehicle computing system. For instance, the vehicle computing system 604 may input the data into the model 108. The model may, in some examples, be a machine learned model as discussed throughout this disclosure.

At operation 708, the process may include receiving an output from the model representing a discretized representation of the environment. For instance, the vehicle computing system may receive the discretized representation 114 from the model 108. Additional details of the discretized representation 114 are discussed throughout the disclosure.

At operation 710, the process may include determining, based at least in part on the discretized representation, a predicted trajectory associated with the object and a weight associated with a predicted trajectory. For instance, the vehicle computing system implement one or more components to determine the predicted trajectories 110A and 110B and the weights 302A and 302B based on a classification probability associated with a cell of the discretized representation. In some examples, the classification probability may indicate whether the object will arrive at a destination at a future time. Additional details of determining predicted trajectories and/or associated weights are discussed throughout the disclosure.

At operation 712, the process may include determining if a model is currently being trained, or whether the model has been trained previously. In some examples, a vehicle computing system may process data (sensor data, map data, image data, and so on) as part of a training operation, an inference operation, or a training operation and an inference operation in parallel. If the model is not being trained (e.g., "no" in the operation 712), the process can continue to operation 714 to cause operation of a vehicle to be controlled based at least in part on the output by the model. If the model is being trained (e.g., "yes" in the operation 712), the process continues to operation 716 to update a parameter(s) of the model based at least in part on the output by the model. Of course, in some examples, operations can be performed in parallel, depending on an implementation.

At the operation 714, the vehicle may be controlled based at least in part on the output from the model 108. For instance, the output from the model 108 can be processed by the planning component 624 of the vehicle to determine an action the vehicle can take to avoid an impact with the object. Additional details of controlling a vehicle using one or more outputs from one or more modes are discussed throughout the disclosure.

At the operation 716, one or more parameters of the model may be updated, altered, and/or augemneted to train the model. In some instances, the output from the model 108 can be compared against training data (e.g., ground truth representing labelled data) for use in training. Based at least in part on the comparison, parameter(s) associated with the model 108 can be updated.

FIG. 8 is a flowchart depicting an example process for determining an intent to associate with a trajectory or a trajectory type using different models.

At operation 802, the process may include determining a vehicle trajectory (e.g., a first trajectory) by a vehicle computing system. For instance, the vehicle computing system 604 may determine a candidate trajectory by the planning component 624. In some examples, the candidate trajectory is a trajectory usable to navigate the vehicle in the environment. In some examples, the operation 802 can include capturing sensor data using a plurality of sensors and fusing or combining the sensor data into a detail and informative representation of the environment.

At operation 804, the process may include determining an object trajectory (e.g., a second trajectory) by a model. For instance, the vehicle computing system 604 may implement the model 108 to determine a predicted trajectory. In some examples, the vehicle computing system 604 may also determine from a weight associated with the predicted trajectory. Examples of such predicted trajectories and weights are discussed throughout this disclosure.

At operation 806, the process may include receiving map data by the vehicle computing system. For instance, the vehicle computing system 604 may receive map data from the map(s) 628. The map data may indicate features of the environment including crosswalks, roads, sidewalks, and so on.

At operation 808, the process may include determining by a same or different model, an output comprising a first intent for the first trajectory and a second intent for the second trajectory. For instance, the vehicle computing system 604 may determine intent(s) using the model 502, and may map locations of the discretized representation 114 from the model 502 to destinations in the map data. In some examples, the model 502 may additionally or instead output one or more intents for a trajectory type (e.g., road trajectory or freeform trajectory). Additional details of the intents are discussed throughout the disclosure.

In some examples, at the operation 808, the process can include sending data representing the output by the model to a planning component of the vehicle computing system to cause the vehicle to plan a trajectory for the vehicle that is based at least in part on the output by the model. Additional details of controlling a vehicle using an output from the model are discussed throughout the disclosure.

At operation 810, the process may include determining if a model is currently being trained, or whether the model has been trained previously. In some examples, a vehicle computing system may process data as part of a training operation, an inference operation, or a training operation and an inference operation in parallel. If the model is not being trained (e.g., "no" in the operation 810), the process can continue to operation 812 to cause operation of a vehicle to be controlled based at least in part on the output by the model. If the model is being trained (e.g., "yes" in the operation 810), the process continues to operation 814 to update a parameter(s) of the model based at least in part on the output by the model. Of course, in some examples, operations can be performed in parallel, depending on an implementation.

At the operation 812, the vehicle may be controlled based at least in part on the output from the model 502. For instance, the output from the model 502 can be processed by the planning component 624 of the vehicle to determine an action the vehicle can take to avoid an impact with the object. Additional details of controlling a vehicle using one or more outputs from one or more modes are discussed throughout the disclosure. In some examples, the planning component 624 may control the vehicle based at least in part on an output from the model 108 and an output from the model 502.

At the operation 814, one or more parameters of the model may be updated, altered, and/or augemneted to train the model. In some instances, the output from the model 502 can be compared against training data (e.g., ground truth representing labelled data) for use in training. Based at least in part on the comparison, parameter(s) associated with the model 502 and/or the model 108 can be updated.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A: A system comprising: one or more processors; and one or more non-transitory computer-readable storage media storing instructions executable by the one or more processors, wherein the instructions, when executed, cause the system to perform operations comprising: receiving sensor data associated with an autonomous vehicle in an environment; determining data based at least in part on the sensor data, the data comprising a top down representation of the environment and an object in the environment; inputting the data into a machine learned model; receiving, from the machine learned model, an output comprising a discretized representation of a portion of the environment, wherein a cell of the discretized representation is associated with a classification probability of a location of the object at a future time; determining, based at least in part on the discretized representation and the classification probability, a predicted trajectory associated with the object and a weight associated with the predicted trajectory; and causing an operation of the autonomous vehicle to be controlled based at least in part on the predicted trajectory associated with the object and the weight associated with the predicted trajectory.

B: The system of paragraph A, wherein the classification probability associated with the cell is indicative of a probability of the object being at the location at the future time.

C: The system of paragraph A or B, wherein: the location is a first location; the cell is a first cell; the classification probability is a first classification probability; the predicted trajectory is a first predicted trajectory; the weight is a first weight; the discretized representation comprises a second cell associated with a second classification probability of a second location of the object at the future time; and the operations further comprise: determining, based at least in part on map data, that the first location is associated with a first destination; determining, based at least in part on the map data, that the second location is associated with a second destination; determining, based at least in part on the second classification probability and the second location, a second predicted trajectory associated with the object at the future time; and causing the operation of the autonomous vehicle to be controlled is further based at least in part on the second predicted trajectory and a second weight associated with the second predicted trajectory.

D: The system of any of paragraphs A-C, the operations further comprising: determining the weight based at least in part on the classification probability and another classification probability.

E: The system of any of paragraphs A-D, wherein: the location represents an offset based at least in part on an object location of the object at a previous time before the future time.

F: One or more non-transitory computer-readable storage media storing instructions that, when executed, cause one or more processors to perform operations comprising: inputting data into a model, the data comprising a top down representation of an environment at a first time; receiving, from the model, an output comprising a discretized representation of a portion of the environment, wherein a cell of the discretized representation is associated with a probability associated with an object at a second time after the first time; determining, based at least in part on the discretized representation and the probability, a trajectory associated with the object and a weight associated with the trajectory; and causing an operation of a vehicle to be controlled based at least in part on the trajectory and the weight.

G: The one or more non-transitory computer-readable storage media of paragraph F, wherein: the data comprises at least one of sensor data, map data, or data based on the sensor data representing one or more channel images to form the top down representation, and the probability associated with the cell is indicative of a probability of the object being at a location at the second time.

H: The one or more non-transitory computer-readable storage media of paragraph F or G, wherein: the location is a first location; the cell is a first cell; the probability is a first probability; the trajectory is a first trajectory; the weight is a first weight; the discretized representation comprises a second cell associated with a second probability of a second location of the object at the second time; and the operations further comprise: determining, based at least in part on map data, that the first location is associated with a first destination; determining, based at least in part on the map data, that the second location is associated with a second destination; determining, based at least in part on the second probability and the second location, a second trajectory associated with the object at the second time; and causing the operation of the vehicle to be controlled is further based at least in part on the second trajectory and a second weight associated with the second trajectory.

I: The one or more non-transitory computer-readable storage media of any of paragraphs F-H, the operations further comprising: sending data comprising the trajectory and the weight to a planning component of the vehicle; and causing the planning component to determine a candidate trajectory for the vehicle to follow in the environment based at least in part on the data.

J: The one or more non-transitory computer-readable storage media of paragraph F-I, the operations further comprising: receiving map data associated with the environment; determining, based at least in part on the map data and a location associated with the cell, that the location is associated with a semantic destination; and determining the weight based at least in part on the probability and the location being associated with the semantic destination at the second time.

K: The one or more non-transitory computer-readable storage media of paragraph F-J, the operations further comprising: determining the weight based at least in part on the probability and another probability.

L: The one or more non-transitory computer-readable storage media of any of paragraphs F-K, wherein the model is a machine learned model trained based at least in part on a comparison between data associated with a previous output of the model and ground truth data.

M: The one or more non-transitory computer-readable storage media of any of paragraphs F-L, the operations further comprising: interpolating a position of the object at the first time and a location associated with the probability at the second time, and wherein the trajectory is based at least in part on the interpolating.

N: The one or more non-transitory computer-readable storage media of any of paragraphs F-M, the operations further comprising: receiving map data associated with the environment; determining, based at least in part on the map data and a location associated with the cell, that the location is associated with a semantic destination; and determining, based at least in part on the semantic destination and the probability, an intent associated with the object; and wherein causing the operation of the vehicle to be controlled is further based at least in part on the intent.

O: A method comprising: inputting image data into a model, the image data comprising a top down representation of an environment at a first time; receiving, from the model, an output comprising a discretized representation of a portion of the environment, wherein a cell of the discretized representation is associated with a probability associated with an object at a second time after the first time; determining, based at least in part on the discretized representation and the probability, a trajectory associated with the object and a weight associated with the trajectory; and causing an operation of a vehicle to be controlled based at least in part on the trajectory and the weight.

P: The method of paragraph O, wherein: the probability associated with the cell is indicative of a probability of the object being at a location at the second time.

Q: The method of paragraphs O or P, wherein: the location represents an offset based at least in part on an object location of the object at a previous time before the second time.

R: The method of paragraphs O-Q, wherein the top down representation of the environment represents one or more of: an object position, an object velocity, an object acceleration, an object yaw, an attribute of the object, crosswalk permission, or traffic light permissibility.

S: The method of paragraphs O-R, further comprising: receiving sensor data of the environment associated with a sensor of the vehicle; determining, based at least in part on the sensor data, a first object type and a second object type associated with the object in the environment, the second object type different from the first object type; determining a first probability of the object being the first object type; and determining a second probability of the object being the second object type, wherein inputting the image data into the model comprises inputting an indication of the first probability associated with the first object type and the second probability associated with the second object type.

T: The method of paragraphs O-S, wherein the vehicle is an autonomous vehicle, and further comprising: sending data comprising the trajectory and the weight to a planning component of the autonomous vehicle; and causing the planning component to determine a candidate trajectory for the autonomous vehicle to follow in the environment based at least in part on the data.

U: A system comprising: one or more processors; and one or more non-transitory computer-readable storage media storing instructions executable by the one or more processors, wherein the instructions, when executed, cause the system to perform operations comprising: receiving sensor data; determining an object represented in the sensor data; determining a first predicted trajectory of the object, the first predicted trajectory associated with a first weight; determining a second predicted trajectory of the object, the second predicted trajectory associated with a second weight; receiving map data; determining, based at least in part on the map data, a first intent of the first trajectory based on a first semantic destination; determining, based at least in part on the map data, a second intent of the second trajectory based on a second semantic destination of the second trajectory; and controlling an autonomous vehicle based at least in part on the first trajectory, the first weight, the first intent, the second trajectory, the second weight, and the second intent.

V: The system of paragraph U, wherein determining the first predicted trajectory comprises performing a regression.

W: The system of paragraph U or V, wherein the second trajectory is based at least in part on classification.

X: The system of any of paragraphs U-W, wherein: the first trajectory is associated with a first destination; and the second trajectory is associated with a second destination different from the first destination.

Y: The system of any of paragraphs U-X, the operations further comprising: determining that one of the first weight or the second weight is higher than the other of the first weight and the second weight; and at least one of: responsive to determining that the first weight is higher than the second weight, controlling the autonomous vehicle in an environment based at least in part on the first trajectory; or responsive to determining that the second weight is higher than the first weight, controlling the autonomous vehicle in the environment based at least in part on the second trajectory.

Z: A method comprising: receiving sensor data; determining an object represented in the sensor data; determining a first trajectory associated with the object; determining a second trajectory associated with the object; determining a first intent of the first trajectory based on a first semantic destination; determining a second intent of the second trajectory based on a second semantic destination of the second trajectory; and sending the first trajectory, the first intent, the second trajectory, and the second intent to a planning component to control a vehicle.

AA: The method of paragraph Z, wherein: the first trajectory is associated with a first trajectory type, and the second trajectory is associated with a second trajectory type different from the first trajectory type.

AB: The method of paragraphs Z or AA, wherein the first trajectory type or the second trajectory type comprises a trajectory type associated with a road segment in an environment of the vehicle.

AC: The method of any of paragraphs Z-AB, further comprising: determining, by a first machine learned model, a first weight associated with the first trajectory; determining, by a second machine learned model, a second weight associated with the second trajectory; and controlling the vehicle based at least in part on the first trajectory, the first weight, the first intent, the second trajectory, the second weight, and the second intent.

AD: The method of any of paragraphs Z-AC, wherein controlling the vehicle comprises determining a candidate trajectory for the vehicle to follow in an environment.

AE: The method of any of paragraphs Z-AD, further comprising determining at least one of the first intent or the second intent based at least in part on a proximity of the object to a region in an environment surrounding the vehicle.

AF: The method of any of paragraphs Z-AE, wherein: the region in the environment comprises a road segment associated with map data representing the environment, the object comprises a pedestrian or a bicycle, the first semantic destination comprises a first region in an environment of the vehicle, and the second semantic destination comprises a second region in the environment of the vehicle different from the first semantic destination.

AG: The method of any of paragraphs Z-AF, wherein the first trajectory is based at least in part on regression and the second trajectory is based at least in part on classification.

AH: The method of any of paragraphs Z-AG, wherein: the first trajectory is associated with a first destination, and the second trajectory is associated with a second destination different from the first destination.

AI: The method of any of paragraphs Z-AH, wherein: the first intent or the second intent comprises at least one of: an intent of the object in an environment of the vehicle to travel along a road segment, an intent of the object to travel outside a proximity of the road segment, an intent of the object to travel within a crosswalk, or an intent of the object to travel outside a boundary of the crosswalk.

AJ: One or more non-transitory computer-readable storage media storing instructions that, when executed, cause one or more processors to perform operations comprising: receiving sensor data; determining an object represented in the sensor data; determining a first trajectory associated with the object; determining a second trajectory associated with the object; determining a first intent of the first trajectory based on a first semantic destination; determining a second intent of the second trajectory based on a second semantic destination of the second trajectory; and sending the first trajectory, the first intent, the second trajectory, and the second intent to a planning component to control a vehicle.

AK: The one or more non-transitory computer-readable media of paragraph AJ, wherein: the first trajectory is associated with a first trajectory type, and the second trajectory is associated with a second trajectory type different from the first trajectory type.

AL: The one or more non-transitory computer-readable media of paragraph AJ or AK, wherein: the first trajectory is associated with a first destination, and the second trajectory is associated with a second destination different from the first destination.

AM: The one or more non-transitory computer-readable media of paragraphs AJ-AL, the operations further comprising: receiving, from a machine learned model, a weight associated with the first trajectory, wherein the sending further comprises sending the weight to the planning component to control the vehicle.

AN: The one or more non-transitory computer-readable media of paragraphs AJ-AM, the operations further comprising determining at least one of the first intent or the second intent based at least in part on a proximity of the object to a region in an environment.

While the example clauses described above are described with respect to one particular implementation, it should be understood that, in the context of this document, the content of the example clauses can also be implemented via a method, device, system, a computer-readable medium, and/ or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable storage media storing instructions executable by the one or more processors, wherein the instructions, when executed, cause the system to perform operations comprising:
receiving sensor data;
determining an object represented in the sensor data;
determining a first predicted trajectory of the object, the first predicted trajectory associated with a first weight;
determining a second predicted trajectory of the object, the second predicted trajectory associated with a second weight;
receiving map data;
determining, based at least in part on the map data, a first intent of the first predicted trajectory based on a first semantic destination;
determining, based at least in part on the map data, a second intent of the second predicted trajectory based on a second semantic destination of the second predicted trajectory;
determining that one of the first weight or the second weight is higher than another of the first weight and the second weight; and
at least one of:
responsive to determining that the first weight is higher than the second weight, sending the first predicted trajectory associated with the object and the first intent to a planning component to enable the planning component to determine a candidate trajectory for a vehicle; or
responsive to determining that the second weight is higher than the first weight, sending the second predicted trajectory associated with the object and the second intent to the planning component to enable the planning component to determine the candidate trajectory for the vehicle.

2. The system of claim 1, wherein determining the first predicted trajectory comprises performing a regression.

3. The system of claim 1, wherein the second predicted trajectory is based at least in part on classification.

4. The system of claim 1, wherein:
the first predicted trajectory is associated with a first destination; and
the second predicted trajectory is associated with a second destination different from the first destination.

5. A method comprising:
receiving sensor data;
determining an object represented in the sensor data;
determining a first trajectory associated with the object, the first trajectory associated with a first weight;
determining a second trajectory associated with the object, the second trajectory associated with a second weight;
determining a first intent of the first trajectory based on a first semantic destination;
determining a second intent of the second trajectory based on a second semantic destination of the second trajectory;
determining that one of the first weight or the second weight is higher than another of the first weight and the second weight; and
at least one of:
responsive to determining that the first weight is higher than the second weight, sending the first trajectory associated with the object and the first intent to a planning component to enable the planning component to determine a candidate trajectory for a vehicle; or
responsive to determining that the second weight is higher than the first weight, sending the second trajectory associated with the object and the second intent to the planning component to enable the planning component to determine the candidate trajectory for the vehicle.

6. The method of claim 5, wherein:
the first trajectory is associated with a first trajectory type, and
the second trajectory is associated with a second trajectory type different from the first trajectory type.

7. The method of claim 6, wherein the first trajectory type or the second trajectory type comprises a trajectory type associated with a road segment in an environment of the vehicle.

8. The method of claim 5, further comprising:
determining, by a first machine learned model, the first weight associated with the first trajectory; and
determining, by a second machine learned model, the second weight associated with the second trajectory.

9. The method of claim 5, wherein enabling the planning component to determine the candidate trajectory for the vehicle comprises determining the candidate trajectory for the vehicle to follow in an environment.

10. The method of claim 5, further comprising determining at least one of the first intent or the second intent based at least in part on a proximity of the object to a region in an environment surrounding the vehicle.

11. The method of claim 10, wherein:
the region in the environment comprises a road segment associated with map data representing the environment,
the object comprises a pedestrian or a bicycle,
the first semantic destination comprises a first region in the environment of the vehicle, and
the second semantic destination comprises a second region in the environment of the vehicle different from the first semantic destination.

12. The method of claim 5, wherein the first trajectory is based at least in part on regression and the second trajectory is based at least in part on classification.

13. The method of claim 5, wherein:
the first trajectory is associated with a first destination, and
the second trajectory is associated with a second destination different from the first destination.

14. The method of claim 5, wherein:
the first intent or the second intent comprises at least one of:
an intent of the object in an environment of the vehicle to travel along a road segment,
an intent of the object to travel outside a proximity of the road segment,
an intent of the object to travel within a crosswalk, or
an intent of the object to travel outside a boundary of the crosswalk.

15. One or more non-transitory computer-readable storage media storing instructions that, when executed, cause one or more processors to perform operations comprising:
receiving sensor data;
determining an object represented in the sensor data;
determining a first trajectory associated with the object, the first trajectory associated with a first weight;
determining a second trajectory associated with the object, the second trajectory associated with a second weight;
determining a first intent of the first trajectory based on a first semantic destination;
determining a second intent of the second trajectory based on a second semantic destination of the second trajectory;
determining that one of the first weight or the second weight is higher than another of the first weight and the second weight; and
at least one of:
responsive to determining that the first weight is higher than the second weight, sending the first trajectory associated with the object and the first intent to a planning component to enable the planning component to determine a candidate trajectory for a vehicle; or
responsive to determining that the second weight is higher than the first weight, sending the second trajectory associated with the object and the second intent to the planning component to enable the planning component to determine the candidate trajectory for the vehicle.

16. The one or more non-transitory computer-readable storage media of claim 15, wherein:
the first trajectory is associated with a first trajectory type, and
the second trajectory is associated with a second trajectory type different from the first trajectory type.

17. The one or more non-transitory computer-readable storage media of claim 16, wherein:
the first trajectory is associated with a first destination, and
the second trajectory is associated with a second destination different from the first destination.

18. The one or more non-transitory computer-readable storage media of claim 15, the operations further comprising:
receiving, from a machine learned model, the first weight associated with the first trajectory.

19. The one or more non-transitory computer-readable storage media of claim 15, the operations further comprising determining at least one of the first intent or the second intent based at least in part on a proximity of the object to a region in an environment.

20. The one or more non-transitory computer-readable storage media of claim 15, wherein the first trajectory is based at least in part on regression and the second trajectory is based at least in part on classification.

* * * * *